(12) United States Patent
Stockett et al.

(10) Patent No.: US 10,895,858 B2
(45) Date of Patent: Jan. 19, 2021

(54) SYSTEMS AND METHODS FOR CONTROLLING ADDITIVE MANUFACTURING

(71) Applicant: CC3D LLC, Coeur d'Alene, ID (US)

(72) Inventors: Ryan C. Stockett, Lebanon, NH (US); Kenneth L. Tyler, Coeur D'alene, ID (US); Blake L. Alfson, Hayden Lake, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 686 days.

(21) Appl. No.: 15/655,622

(22) Filed: Jul. 20, 2017

(65) Prior Publication Data

US 2018/0065308 A1 Mar. 8, 2018

Related U.S. Application Data

(60) Provisional application No. 62/526,448, filed on Jun. 29, 2017, provisional application No. 62/459,398, (Continued)

(51) Int. Cl.
*G05B 19/042* (2006.01)
*B33Y 50/02* (2015.01)
(Continued)

(52) U.S. Cl.
CPC ........ *G05B 19/0426* (2013.01); *B29C 64/118* (2017.08); *B29C 64/209* (2017.08);
(Continued)

(58) Field of Classification Search
CPC ............ G05B 19/0426; G05B 19/4099; G05B 2219/49023; B33Y 10/00; B33Y 30/00;
(Continued)

(56) References Cited

U.S. PATENT DOCUMENTS 1,986,974 A 1/1935 Kellogg
3,286,305 A 11/1966 Seckel
(Continued)

FOREIGN PATENT DOCUMENTS

DE 4102257 A1 7/1992
EP 0063954 A1 11/1982
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Kamini S Shah
*Assistant Examiner* — John E Johansen
(74) *Attorney, Agent, or Firm* — Ryan Stockett

(57) ABSTRACT

A system is disclosed for use in additively manufacturing a structure. The system may include an additive manufacturing machine, a memory having computer-executable instructions stored thereon, and a processor. The processor may be configured to execute the computer-executable instructions to make a determination associated with the structure being a performance-critical part and, based on the determination, selectively implement a first slicing technique or a second slicing technique to divide a virtual model of the structure into a plurality of planes. The processor may be further configured to execute the computer-executable instructions to cause the additive manufacturing machine to deposit composite material in layers corresponding to the plurality of planes.

16 Claims, 12 Drawing Sheets

Related U.S. Application Data filed on Feb. 15, 2017, provisional application No. 62/449,899, filed on Jan. 24, 2017, provisional application No. 62/417,709, filed on Nov. 4, 2016, provisional application No. 62/383,801, filed on Sep. 6, 2016.

(51) Int. Cl.

| | | |
|---|---|---|
| B29C 64/393 | (2017.01) | |
| B33Y 30/00 | (2015.01) | |
| B29C 64/118 | (2017.01) | |
| B29C 70/38 | (2006.01) | |
| B33Y 10/00 | (2015.01) | |
| B29C 64/209 | (2017.01) | |
| G05B 19/4099 | (2006.01) | |

(52) U.S. Cl.
CPC .......... *B29C 64/393* (2017.08); *B29C 70/382* (2013.01); *B33Y 10/00* (2014.12); *B33Y 30/00* (2014.12); *B33Y 50/02* (2014.12); *G05B 19/4099* (2013.01); *G05B 2219/49023* (2013.01)

(58) Field of Classification Search
CPC ..... B33Y 50/02; B29C 64/118; B29C 64/209; B29C 64/393; B29C 70/382
USPC .............................................................. 703/1
See application file for complete search history.

(56) References Cited

U.S. PATENT DOCUMENTS

| | | | |
|---|---|---|---|
| 3,474,615 | A | 10/1969 | Irwin et al. |
| 3,634,972 | A | 1/1972 | Illman |
| 3,643,417 | A | 2/1972 | Irwin |
| 3,809,514 | A | 5/1974 | Nunez |
| 3,867,810 | A | 2/1975 | Meertens et al. |
| 3,904,458 | A | 9/1975 | Wray |
| 3,984,271 | A | 10/1976 | Gilbu |
| 3,993,726 | A | 11/1976 | Moyer |
| 4,089,727 | A | 5/1978 | McLain |
| 4,201,618 | A | 5/1980 | Lewis |
| 4,373,412 | A | 2/1983 | Gerber et al. |
| 4,428,992 | A | 1/1984 | Street |
| 4,500,372 | A | 2/1985 | Mion |
| 4,523,600 | A | 6/1985 | Donovan |
| 4,571,929 | A | 2/1986 | Bertrams |
| 4,573,313 | A | 3/1986 | Bertrams |
| 4,577,458 | A | 3/1986 | Garnsworthy |
| 4,608,816 | A | 9/1986 | Bertrams et al. |
| 4,643,940 | A | 2/1987 | Shaw et al. |
| 4,671,761 | A | 6/1987 | Adrian et al. |
| 4,757,676 | A | 7/1988 | Clayton |
| 4,822,548 | A | 4/1989 | Hempel |
| 4,825,630 | A | 5/1989 | Czelusniak et al. |
| 4,833,872 | A | 5/1989 | Czelusniak et al. |
| 4,851,065 | A | 7/1989 | Curtz |
| 4,947,635 | A | 8/1990 | Speranzin et al. |
| 4,954,152 | A | 9/1990 | Hsu et al. |
| 4,987,808 | A | 1/1991 | Sicka et al. |
| 5,002,712 | A | 3/1991 | Goldmann et al. |
| 5,037,691 | A | 8/1991 | Medney et al. |
| 5,042,902 | A | 8/1991 | Huebscher et al. |
| 5,121,329 | A | 6/1992 | Crump |
| 5,167,111 | A | 12/1992 | Cottenceau et al. |
| 5,296,335 | A | 3/1994 | Thomas et al. |
| 5,340,433 | A | 8/1994 | Crump |
| 5,354,414 | A | 10/1994 | Feygin |
| 5,746,967 | A | 5/1998 | Hoy et al. |
| 5,866,058 | A | 2/1999 | Batchelder et al. |
| 5,936,861 | A | 8/1999 | Jang et al. |
| 6,153,034 | A | 11/2000 | Lipsker |
| 6,214,279 | B1 | 4/2001 | Yang et al. |
| 6,459,069 | B1 | 10/2002 | Rabinovich |
| 6,501,554 | B1 | 12/2002 | Hackney et al. |
| 6,799,081 | B1 | 9/2004 | Hale et al. |
| 6,803,003 | B2 | 10/2004 | Rigall et al. |
| 6,934,600 | B2 | 8/2005 | Jang et al. |
| 7,039,485 | B2 | 5/2006 | Engelbart et al. |
| 7,555,404 | B2 | 6/2009 | Brennan et al. |
| 7,795,349 | B2 | 9/2010 | Bredt et al. |
| 8,221,669 | B2 | 7/2012 | Batchelder et al. |
| 8,851,609 | B2 | 10/2014 | Saita |
| 8,962,717 | B2 | 2/2015 | Roth et al. |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 9,186,846 | B1 | 11/2015 | Mark et al. |
| 9,186,848 | B2 | 11/2015 | Mark et al. |
| 9,327,452 | B2 | 5/2016 | Mark et al. |
| 9,327,453 | B2 | 5/2016 | Mark et al. |
| 9,370,896 | B2 | 6/2016 | Mark |
| 9,381,702 | B2 | 7/2016 | Hollander |
| 9,457,521 | B2 | 10/2016 | Johnston et al. |
| 9,458,955 | B2 | 10/2016 | Hammer et al. |
| 9,527,248 | B2 | 12/2016 | Hollander |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,764,378 | B2 | 9/2017 | Peters et al. |
| 9,770,876 | B2 | 9/2017 | Farmer et al. |
| 9,782,926 | B2 | 10/2017 | Witzel et al. |
| 2002/0009935 | A1 | 1/2002 | Hsiao et al. |
| 2002/0062909 | A1 | 5/2002 | Jang et al. |
| 2002/0113331 | A1 | 8/2002 | Zhang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2004/0254633 | A1 | 12/2004 | Rapaport et al. |
| 2005/0006803 | A1 | 1/2005 | Owens |
| 2005/0061422 | A1 | 3/2005 | Martin |
| 2005/0065400 | A1 | 3/2005 | Banik et al. |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2006/0118198 | A1 | 6/2006 | Eisenhut |
| 2007/0003650 | A1 | 1/2007 | Schroeder |
| 2007/0228592 | A1 | 10/2007 | Dunn et al. |
| 2008/0176092 | A1 | 7/2008 | Owens |
| 2009/0095410 | A1 | 4/2009 | Oldani |
| 2011/0032301 | A1 | 2/2011 | Fienup et al. |
| 2011/0143108 | A1 | 6/2011 | Fruth et al. |
| 2012/0060468 | A1 | 3/2012 | Dushku et al. |
| 2012/0159785 | A1 | 6/2012 | Pyles et al. |
| 2012/0231225 | A1 | 9/2012 | Mikulak et al. |
| 2012/0247655 | A1 | 10/2012 | Erb et al. |
| 2013/0164498 | A1 | 6/2013 | Langone et al. |
| 2013/0209600 | A1 | 8/2013 | Tow |
| 2013/0233471 | A1 | 9/2013 | Kappesser et al. |
| 2013/0241114 | A1 | 9/2013 | Ravich et al. |
| 2013/0292039 | A1 | 11/2013 | Peters et al. |
| 2013/0337256 | A1 | 12/2013 | Farmer et al. |
| 2013/0337265 | A1 | 12/2013 | Farmer |
| 2014/0034214 | A1 | 2/2014 | Boyer et al. |
| 2014/0061974 | A1 | 3/2014 | Tyler |
| 2014/0159284 | A1 | 6/2014 | Leavitt |
| 2014/0170012 | A1 | 6/2014 | Delisle et al. |
| 2014/0232035 | A1 | 8/2014 | Bheda |
| 2014/0242208 | A1 | 8/2014 | Elsworthy |
| 2014/0268604 | A1 | 9/2014 | Wicker et al. |
| 2014/0291886 | A1 | 10/2014 | Mark et al. |
| 2014/0361460 | A1 | 12/2014 | Mark |
| 2015/0005919 | A1 | 1/2015 | McGatha et al. |
| 2015/0174824 | A1 | 1/2015 | Lee et al. |
| 2015/0136455 | A1 | 5/2015 | Fleming |
| 2015/0165691 | A1 | 6/2015 | Mark et al. |
| 2015/0201500 | A1 | 7/2015 | Shinar et al. |
| 2015/0217517 | A1 | 8/2015 | Karpas et al. |

(56) References Cited

U.S. PATENT DOCUMENTS

| | | |
|---|---|---|
| 2015/0321419 A1 | 11/2015 | Linthicunn et al. |
| 2015/0321441 A1 | 11/2015 | Marcoe et al. |
| 2015/0343673 A1 | 12/2015 | Williams |
| 2016/0009029 A1 | 1/2016 | Cohen et al. |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0136887 A1 | 5/2016 | Guillemette et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0288420 A1 | 10/2016 | Anderson et al. |
| 2016/0297104 A1 | 10/2016 | Guillemette et al. |
| 2016/0306901 A1* | 10/2016 | Ainsworth ............. B33Y 50/00 |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151704 A1* | 6/2017 | Go ........................ B29C 64/209 |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1* | 9/2017 | Chapiro ................. B33Y 10/00 |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 1932636 A1 | 6/2008 |
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016011252 A1 | 1/2016 |
| WO | 2016088042 A1 | 6/2016 |
| WO | 2016088048 A1 | 6/2016 |
| WO | 2016110444 A1 | 7/2016 |
| WO | 2016125138 A2 | 8/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Oct. 13, 2016 for PCT/US2016/042906 to CC3D LLC Filed Jul. 19, 2016.

Kenneth C. Kennedy II & Robert P. Kusy, UV-Cured Pultrusion

(56) References Cited

OTHER PUBLICATIONS

Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

Website-Markforged Installing Fiber Spool Tensioner.

International Search Report dated Dec. 27, 2017 for PCT/US2017/047493 to CC3D LLC Filed Aug. 18, 2017.

\* cited by examiner

SYSTEMS AND METHODS FOR CONTROLLING ADDITIVE MANUFACTURING

RELATED APPLICATIONS

This application is based on and claims the benefit of priority from U.S. Provisional Application Nos. 62/383,801 filed on Sep. 6, 2016; 62/417,709 filed on Nov. 4, 2016; 62/449,899 filed on Jan. 24, 2017; 62/459,398 filed on Feb. 15, 2017; and 62/526,448 filed on Jun. 29, 2017, the contents of all of which are expressly incorporated herein by reference.

TECHNICAL FIELD

The present disclosure relates generally to manufacturing control systems and, more particularly, to systems and methods for controlling additive manufacturing.

BACKGROUND

Traditional additive manufacturing is a process of creating three-dimensional parts by depositing overlapping layers of material under the guided control of a computer. A common form of additive manufacturing is known as fused deposition modeling (FDM). Using FDM, a thermoplastic is passed through and liquified within a heated print head. The print head is moved in a predefined trajectory (a.k.a., a tool path) as the material discharges from the print head, such that the material is laid down in a particular pattern and shape of overlapping 2-dimensional layers. The material, after exiting the print head, cools and hardens into a final form. A strength of the final form is primarily due to properties of the particular thermoplastic supplied to the print head and a 3-dimensional shape formed by the stack of 2-dimensional layers.

A recently developed improvement over traditional FDM manufacturing involves the use of continuous fibers embedded within material discharging from the print head. In particular, a matrix is supplied to the print head and discharged (e.g., extruded and/or pultruded) along with one or more continuous fibers also passing through the same head at the same time. The matrix can be a traditional thermoplastic, a powdered metal, a liquid matrix (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

The disclosed systems and methods are directed to addressing ways of controlling additive manufacturing systems similar to those disclosed in the '543 patent and/or other systems known in the art.

SUMMARY

In one aspect, the present disclosure is directed to system for use in additively manufacturing a structure. The system may include an additive manufacturing machine, a memory having computer-executable instructions stored thereon, and a processor. The processor may be configured to execute the instructions to make a determination associated with the structure being a performance-critical part and, based on the determination, selectively implement a first slicing technique or a second slicing technique to divide a virtual model of the structure into a plurality of planes. The processor may be further configured to execute the computer-executable instructions to cause the additive manufacturing machine to deposit composite material in layers corresponding to the plurality of planes.

In another aspect, the present disclosure is directed to a method of fabricating a structure with an additive manufacturing machine. The method may include receiving input indicative of at least one of an anticipated loading condition of the structure and a performance specification, and making a determination associated with the structure being a performance-critical part based on the input. Based on the determination, the method may further include selectively implementing a first slicing technique or a second slicing technique to divide a virtual model of the structure into a plurality of planes, and causing the additive manufacturing machine to deposit composite material in layers corresponding to the plurality of planes.

In yet another aspect, the present disclosure is directed to a non-transitory computer readable medium containing computer-executable programming instructions for performing a method of additively manufacturing a structure. The method may include receiving input indicative of at least one of an anticipated loading condition of the structure and a performance specification, and making a determination associated with the structure being a performance-critical part based on the input. Based on the determination, the method may further include selectively implementing a first slicing technique to generate a plurality of planes that allow the additive manufacturing machine to efficiently deposit the composite material in a generally parallel and overlapping manner, and selectively implementing a second slicing technique to generate the plurality of planes that allow the additive manufacturing machine to deposit the composite material in layers based on forces anticipated to pass through the structure. The method may also include generating at least a first tool path on each of the plurality of planes generated using the first slicing technique to be followed by the additive manufacturing machine during discharge of the composite material. The at least a first tool path may spiral outward from a general center of each of the plurality of planes generated using the first slicing technique. The method may further include generating at least a second tool path on each of the plurality of planes generated using the second slicing technique to be followed by the additive manufacturing machine during discharge of the composite material. The at least a second tool path generated using the second slicing technique may generally be oriented based on the forces. The method may additionally include causing the additive manufacturing machine to deposit composite material in layers corresponding to the plurality of planes following the at least a first tool path and the at least a second tool path.

DETAILED DESCRIPTION

Figure 1:
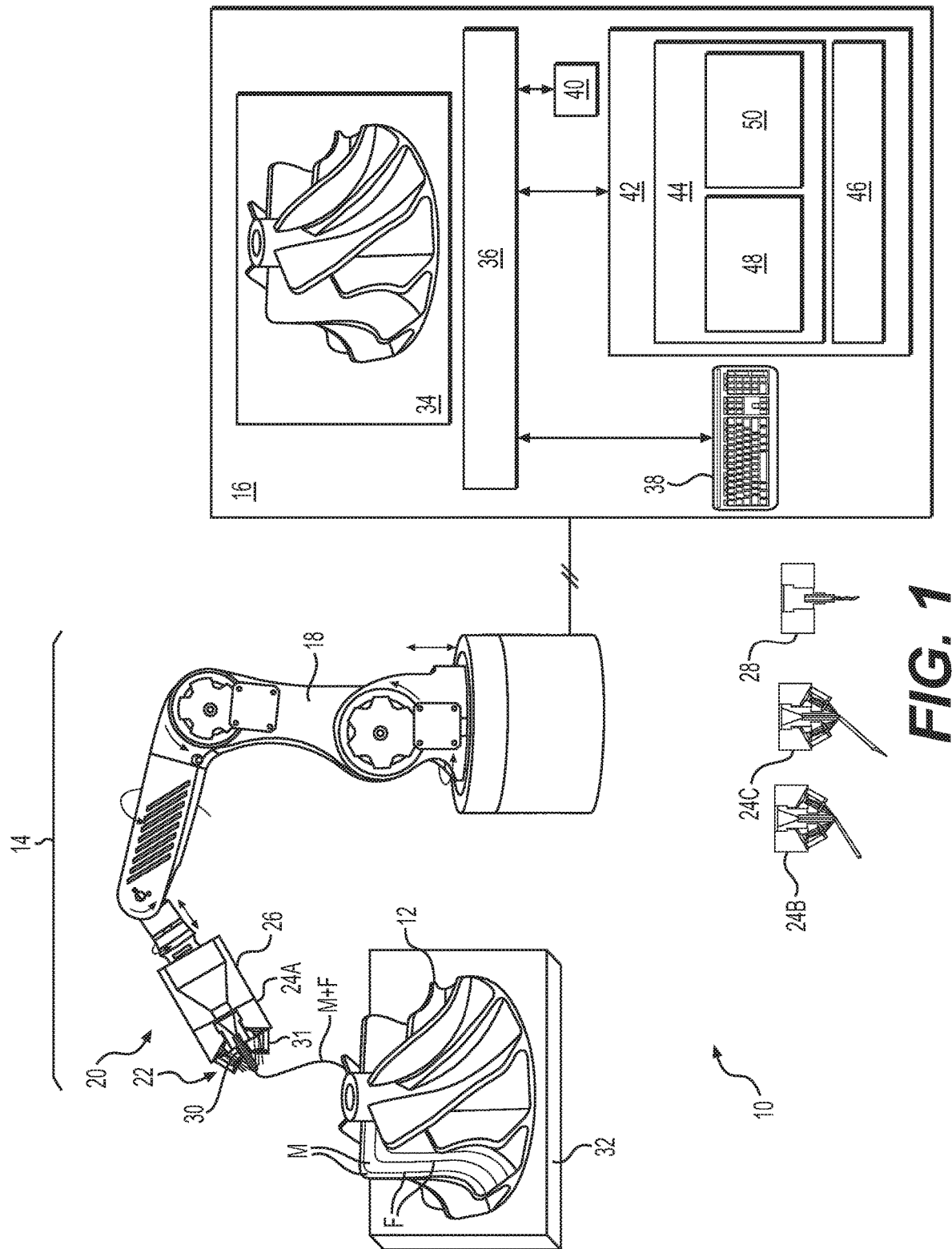
FIG. 1 is a diagrammatic illustration of an exemplary disclosed additive manufacturing machine and a corresponding system that may be used to control the machine.

FIG. 1 illustrates an exemplary control system ("system") 10, which may be used to design, plan, fabricate, and/or analyze a structure 12 having any desired shape, size, consist, and functionality. System 10 may include, among other things, an additive manufacturing machine ("machine") 14 and at least one computing device 16 operatively connected to machine 14. Machine 14 may be configured to create structure 12 under the guided control of computing device 16, for example by way of an additive manufacturing process. Although additive manufacturing processes utilizing one or more continuous reinforcements (e.g., fibers—F) and one or more curable matrixes (M) will be described below as one example of how structure 12 may be created, it should be noted that other processes known in the art could alternatively be utilized for this purpose and benefit from the disclosed control systems and methods.

Machine 14 may be comprised of components that are controllable to create structure 12, layer-by-layer and/or in free space (e.g., without the bracing of an underlying layer). These components may include, among other things, a support 18 and any number of heads 20 coupled to and powered by support 18. In the disclosed embodiment of FIG. 1, support 18 is a robotic arm capable of moving head 20 in multiple directions during fabrication of structure 12. It should be noted that any other type of support (e.g., an overhead gantry, an arm/gantry combination, etc.) capable of moving head 20 in the same or in a different manner could also be utilized, if desired.

Each head 20 (only one shown in FIG. 1, for clarity) may be configured to discharge at least a matrix (e.g., a liquid resin, such as a zero volatile organic compound resin; a powdered metal; etc.) that is curable. Exemplary curable matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside each head 20 may be pressurized, for example by an external device (e.g., an extruder or another type of pump—not shown) that is fluidly connected to head 20 via a corresponding conduit (not shown). In another embodiment, however, the pressure may be generated completely inside of head 20 by a similar type of device. In yet other embodiments, the matrix may be gravity-fed through and/or mixed within head 20. In some instances, the matrix inside head 20 may need to be kept cool and/or dark to inhibit premature curing; while in other instances, the matrix may need to be kept warm for the same reason. In either situation, head 20 may be specially configured (e.g., insulated, chilled, and/or warmed) to provide for these needs.

In some embodiments, the matrix may be mixed with, contain, or otherwise coat one or more fibers (e.g., individual fibers, tows, rovings, sleeves, ribbons, and/or sheets of material) and, together with the fibers, make up at least a portion (e.g., a wall) of structure 12. The fibers may be stored within (e.g., on separate internal spools—not shown) or otherwise passed through head 20 (e.g., fed from external spools). When multiple fibers are simultaneously used, the fibers may be of the same type and have the same diameter and cross-sectional shape (e.g., circular, square, flat, etc.), or of a different type with different diameters and/or cross-sectional shapes. The fibers may include, for example, carbon fibers, vegetable fibers, wood fibers, mineral fibers, glass fibers, metallic wires, optical tubes, etc. It should be noted that the term "fiber" is meant to encompass both structural and non-structural types of continuous reinforcements that can be at least partially encased in the matrix discharging from head 20.

The fibers may be exposed to (e.g., coated with) the matrix while the fibers are inside head 20, while the fibers are being passed to head 20, and/or while the fibers are discharging from head 20, as desired. The matrix, dry fibers, and/or fibers that are already exposed to the matrix (e.g., wetted fibers) may be transported into head 20 in any manner apparent to one skilled in the art.

Support 18 may move head 20 in a particular trajectory (e.g., a trajectory corresponding to an intended shape, size, and/or function of structure 12) at the same time that the matrix-coated fiber(s) discharge from head 20, such that continuous paths of matrix-coated fiber(s) are formed along the trajectory. Each path may have any cross-sectional shape, diameter, and/or fiber and matrix density, and the fibers may be radially dispersed with the matrix, located at a general center thereof, or located only at a periphery.

One or more cure enhancers (e.g., a UV light, an ultrasonic emitter, a laser, a heater, a catalyst dispenser, etc.) 22 may be mounted proximate (e.g., within or on) head 20 and configured to enhance a cure rate and/or quality of the matrix as it is discharged from head 20. Cure enhancer 22 may be regulated to selectively expose surfaces of structure 12 to energy (e.g., to UV light, electromagnetic radiation, vibrations, heat, a chemical catalyst or hardener, etc.) during the formation of structure 12. The energy may increase a rate of chemical reaction occurring within the matrix, sinter the matrix, harden the matrix, or otherwise cause the matrix to cure as it discharges from head 20. In the depicted embodiments, cure enhancer 22 includes multiple LEDs that are equally distributed about a center axis of head 20. However, it is contemplated that any number of LEDs or other energy sources could alternatively be utilized for the disclosed purposes and/or arranged in another manner (e.g., unequally distributed, arranged in a row, etc.). For example, cure enhancers 22 could be located on an arm (not shown) that trails behind head 20, if desired. The amount of energy produced by cure enhancer 22 may be sufficient to cure the matrix before structure 12 axially grows more than a predetermined length away from head 20. In one embodiment, structure 12 is completely cured before the axial growth length becomes equal to an external diameter of the matrix-coated reinforcement.

In the embodiment of FIG. 1, head 20 is modular. For example, head 20 may include a matrix reservoir 26 and a nozzle module 24 removably connected to matrix reservoir 26 (e.g., via one or more threaded fasteners, clasps, or other hardware—not shown). In this example, nozzle module 24 is a single-track nozzle module 24A configured to discharge composite material having a generally circular cross-section. The configuration of head 20, however, may allow nozzle module 24A to be swapped out for another nozzle module (e.g., module 24B, module 24C, etc.) that discharges composite material having a different shape (e.g., a tubular cross-section, a ribbon or sheet cross-section, etc.). During this swap-out, matrix reservoir 26 may remain connected to support 18, and few (if any) modifications of matrix reservoir 26 may be required.

In one embodiment, nozzle module 24 may also or alternatively be selectively swapped out for a machining module 28. For example, a module having one or more finishing tools (e.g., drill bits, milling bits, blades, grinders, painters, coaters, cleaning devices, etc.) may be selectively attached to matrix reservoir 26 (or directly to an end of support 18), if desired. This configuration may allow for a greater range of structures 14 to be fabricated by machine 14.

In some embodiments, cure enhancer(s) 22 may be mounted to a lower surface of nozzle module 24. With this configuration, cure enhancer(s) 22 may be located around a nozzle tip in a configuration that best suits the shape, size, and/or type of material discharging from nozzle module 24. In the disclosed embodiment, cure enhancer(s) 22 are mounted at an angle relative to an axis of nozzle module 24, such that energy from cure enhancer(s) 22 is directed toward the material discharging from nozzle module 24. An energy blocker 30 and/or optics 31 may be used in some applications, to selectively block, focus, and/or aim the energy from cure enhancers 22 at an outlet of nozzle module 24. This may affect a cure rate of and/or cure location on the material discharging from nozzle module 24. It is contemplated that energy blocker 30 and/or optics 31 may be adjustable, if desired (e.g., manually adjustable via a set screw—not shown, or automatically adjustable via an actuator—not shown).

The matrix and fiber(s) may be discharged from head 20 via at least two different modes of operation. In a first mode of operation, the matrix and fiber(s) are extruded (e.g., pushed under pressure and/or mechanical force) from head 20, as head 20 is moved by support 18 to create the shape of structure 12. In a second mode of operation, at least the fiber(s) are pulled from head 20, such that tensile stresses are created in the fiber(s) during discharge that remain after curing of the matrix. In this mode of operation, the matrix may cling to the fiber(s) and thereby also be pulled from head 20 along with the fiber(s), and/or the matrix may be discharged from head 20 under pressure along with the pulled fiber(s). In the second mode of operation, where the fiber(s) are being pulled from head 20, the resulting residual tension in the fiber(s) may increase a strength of structure 12, while also allowing for a greater length of unsupported material to have a straighter trajectory (i.e., the residual tension may act against the force of gravity to provide free-standing support for structure 12).

The fiber(s) may be pulled from head 20 as a result of head 20 moving away from an anchor point 32. For example, at the start of structure-formation, a length of matrix-impregnated fiber(s) may be pulled and/or pushed from head 20, deposited onto anchor point 32, and cured, such that the discharged material adheres to anchor point 32. Thereafter, head 20 may be moved away from anchor point 32, and the relative movement may cause the fiber(s) to be pulled from head 20. It should be noted that the movement of fiber(s) through head 20 could be assisted (e.g., via internal feed mechanisms), if desired. However, the discharge rate of fiber(s) from head 20 may primarily be the result of relative movement between head 20 and anchor point 32, such that tension is created within the fiber(s). It is contemplated that anchor point 32 could be moved away from head 20 instead of or in addition to head 20 being moved away from anchor point 32.

As will be described in more detail below, it has been determined that a tension vector associated with each continuous fiber discharged by head 20 may contribute to a characteristic (e.g., a stiffness and/or strength) of structure 12. For example, a stiffness and/or strength of structure 12 may be generally greater in an axial direction of each fiber, and greater by an amount related to the level of residual tension in that fiber. Accordingly, during a pre-processing (e.g., design) phase and/or processing phase of fabricating structure 12, care may be taken to provide a desired amount, size, and/or shape of particular fibers in alignment with particular trajectories and/or to generate desired tension levels within each of the fibers prior to and/or during curing, such that structure 12 performs according to required specifications.

Any number of separate computing devices 16 may be used to design and/or control the placement and residual tension of fibers within structure 12 and/or to analyze performance characteristics (e.g., stiffness and strength, and/or other characteristics such as continuity) of structure 12 before and/or after formation. Computing device 16 may include, among other things, a display 34, one or more processors 36, any number of input/output ("I/O") devices 38, any number of peripherals 40, and one or more memories 42 for storing programs 44 and data 46. Programs 44 may include, for example, any number of design and/or printing apps 48 and an operating system 50.

Display 34 of computing device 16 may include a liquid crystal display (LCD), a light emitting diode (LED) screen, an organic light emitting diode (OLED) screen, and/or another known display device. Display 34 may be used for presentation of data under the control of processor 36.

Processor 36 may be a single or multi-core processor configured with virtual processing technologies, and use logic to simultaneously execute and control any number of operations. Processor 36 may be configured to implement virtual machine or other known technologies to execute, control, run, manipulate, and store any number of software modules, applications, programs, etc. In addition, in some embodiments, processor 36 may include one or more specialized hardware, software, and/or firmware modules (not shown) specially configured with particular circuitry, instructions, algorithms, and/or data to perform functions of the disclosed methods. It is appreciated that other types of processor arrangements could be implemented that provide for the capabilities disclosed herein.

Memory 42 can be a volatile or non-volatile, magnetic, semiconductor, tape, optical, removable, non-removable, or other type of storage device or tangible and/or non-transitory computer-readable medium that stores one or more executable programs 44, such as analysis and/or printing apps 48 and operating system 50. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, an EPROM, a FLASH-EPROM or other flash memory, NVRAM, a cache, a register or other memory chip or cartridge, and networked versions of the same.

Memory 42 may store instructions that enable processor 36 to execute one or more applications, such as design and/or fabrication apps 48, operating system 50, and any other type of application or software known to be available on computer systems. Alternatively or additionally, the instructions, application programs, etc. can be stored in an internal and/or external database (e.g., a cloud storage system—not shown) that is in direct communication with computing device 16, such as one or more databases or memories accessible via one or more networks (not shown). Memory 42 can include one or more memory devices that store data and instructions used to perform one or more features of the disclosed embodiments. Memory 42 can also include any combination of one or more databases controlled by memory controller devices (e.g., servers, etc.) or software, such as document management systems, Microsoft SQL databases, SharePoint databases, Oracle™ databases, Sybase™ databases, or other relational databases.

In some embodiments, computing device 16 is communicatively connected to one or more remote memory devices (e.g., remote databases—not shown) through a network (not shown). The remote memory devices can be configured to store information that computing device 16 can access and/or manage. By way of example, the remote memory devices could be document management systems, Microsoft SQL database, SharePoint databases, Oracle™ databases, Sybase™ databases, Cassandra, HBase, or other relational or non-relational databases or regular files. Systems and methods consistent with disclosed embodiments, however, are not limited to separate databases or even to the use of a database.

Programs 44 may include one or more software or firmware modules causing processor 36 to perform one or more functions of the disclosed embodiments. Moreover, processor 36 can execute one or more programs located remotely from computing device 16. For example, computing device 16 can access one or more remote programs that, when executed, perform functions related to disclosed embodiments. In some embodiments, programs 44 stored in memory 42 and executed by processor 36 can include one or more of design, fabrication, and/or analysis apps 48 and operating system 50. Apps 48 may cause processor 36 to perform one or more functions of the disclosed methods.

Operating system 50 may perform known operating system functions when executed by one or more processors such as processor 36. By way of example, operating system 50 may include Microsoft Windows™, Unix™, Linux™, OSX™, and IOS™ operating systems, Android™ operating systems, or another type of operating system 50. Accordingly, disclosed embodiments can operate and function with computer systems running any type of operating system 50.

I/O devices 38 may include one or more interfaces for receiving signals or input from a user and/or machine 14, and for providing signals or output to machine 14 that allow structure 12 to be printed. For example, computing device 16 can include interface components for interfacing with one or more input devices, such as one or more keyboards, mouse devices, and the like, which enable computing device 16 to receive input from a user.

Figure 2:
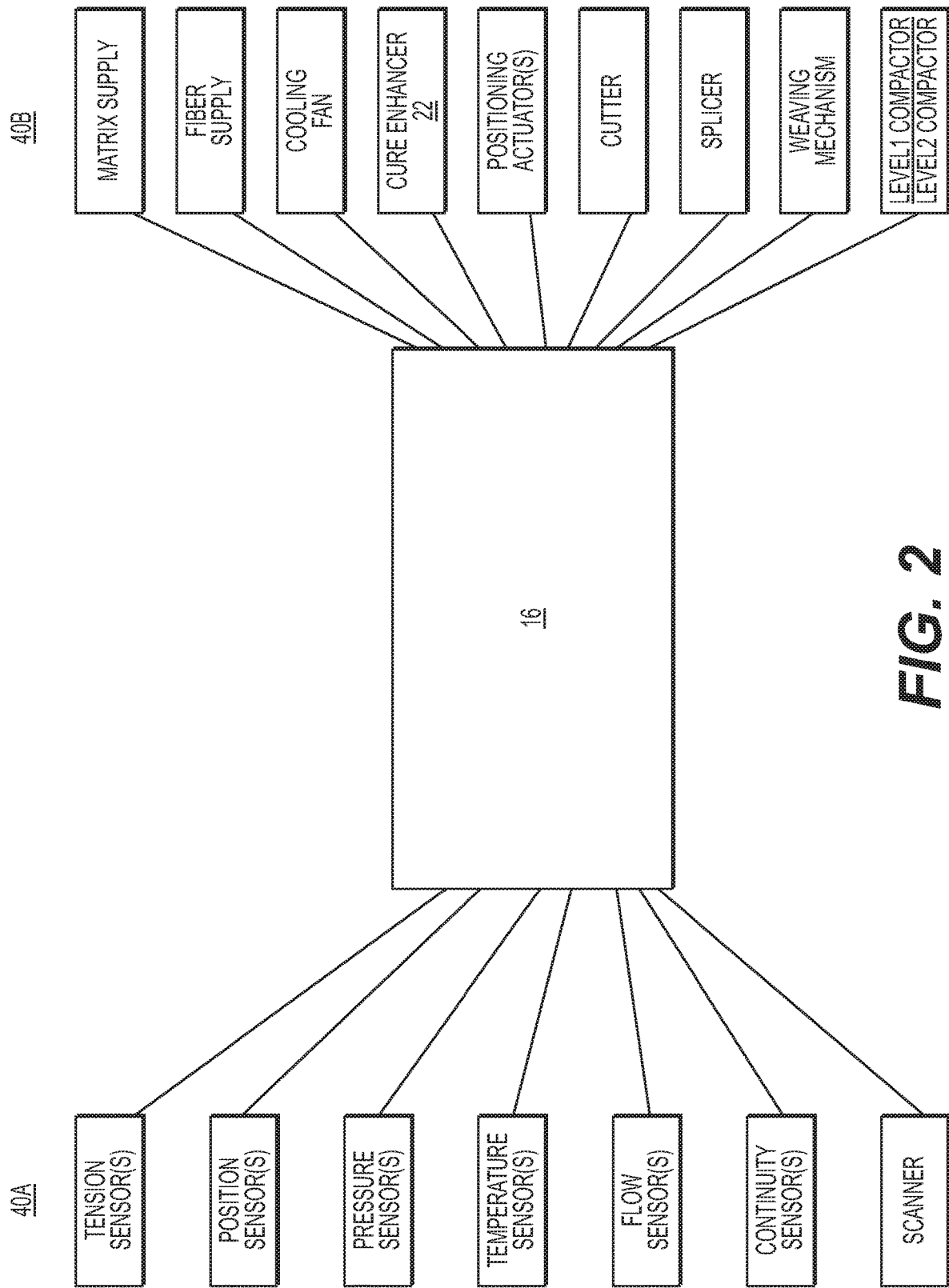
FIG. 2 is a schematic illustration of the control system of FIG. 1.

Peripheral device(s) 40 may be standalone devices or devices that are embedded within or otherwise associated with machine 14 and used during fabrication of structure 12. As shown in FIG. 2, peripherals 40 can embody input devices (e.g., one or more sensors, such as tension sensors, position sensors, pressure sensors, temperature sensors, flow sensors, continuity sensors, humidity sensors, rotary encoders, and other sensors known in the art) 40A and/or output devices (e.g., one or more actuators, such as a matrix supply, a fiber supply, a cooling fan, a pump, cure enhancer 22, a positioning motor, a cutter, a splicer, a weaving mechanism, a fiber guide, a mixer, a feed roller, a friction tensioner, etc.) 40B. In some embodiments, peripherals 40 may, themselves, include one or more processors, a memory, and/or a transceiver. When peripheral device(s) 40 are equipped with a dedicated processor and memory, the dedicated processor may be configured to execute instructions stored on the memory to receive commands from processor 36 associated with video, audio, other sensory data, control data, location data, etc., including capture commands, processing commands, motion commands, and/or transmission commands.

The transceiver may include a wired or wireless communication device capable of transmitting data to or from one or more other components in system 10. In some embodiments, the transceiver can receive data from processor 36, including instructions for sensor and/or actuator activation and for the transmission of data via the transceiver. In response to the received instructions, the transceiver can packetize and transmit data between processor 36 and the other components.

Design, fabrication, and/or analysis apps 48 may cause computing device 16 to perform methods related to generating, receiving, processing, analyzing, storing, and/or transmitting data in association with operation of machine 14 and corresponding design/fabrication/analysis of structure 12. For example, apps 48 may be able to configure computing device 16 to perform operations including: displaying a graphical user interface (GUI) on display 34 for receiving design/control instructions and information from the operator of machine 14; capturing sensory data associated with machine 14 (e.g., via peripherals 40A); receiving instructions via I/O devices 38 and/or the user interface regarding specifications, desired characteristics, and/or desired performance of structure 12; processing the control instructions; generating one or more possible designs of and/or plans for fabricating structure 12; analyzing and/or optimizing the designs and/or plans; providing recommendations of one or more designs and/or plans; controlling machine 14 to fabricate a recommended and/or selected design via a recommended and/or selected plan; analyzing the fabrication; and/or providing feedback and adjustments to machine 14 for improving future fabrications.

FIGS. 3-11 are flowcharts depicting exemplary methods that may be implemented by computing device 16 during design, fabrication, and/or analysis of structure 12 by machine 14. FIGS. 3-11 will be discussed in detail in the following section to further illustrate the disclosed concepts.

INDUSTRIAL APPLICABILITY

The disclosed systems may be used to continuously manufacture composite structures having any desired cross-sectional shape, length, density, stiffness, strength, and/or other characteristic. The composite structures may include any number of different reinforcements of the same or different types, diameters, shapes, configurations, and consists, and/or any number of different matrixes. Operation of system 10 will now be described in detail, with reference to the flowcharts of FIGS. 3-11.

Figure 3:
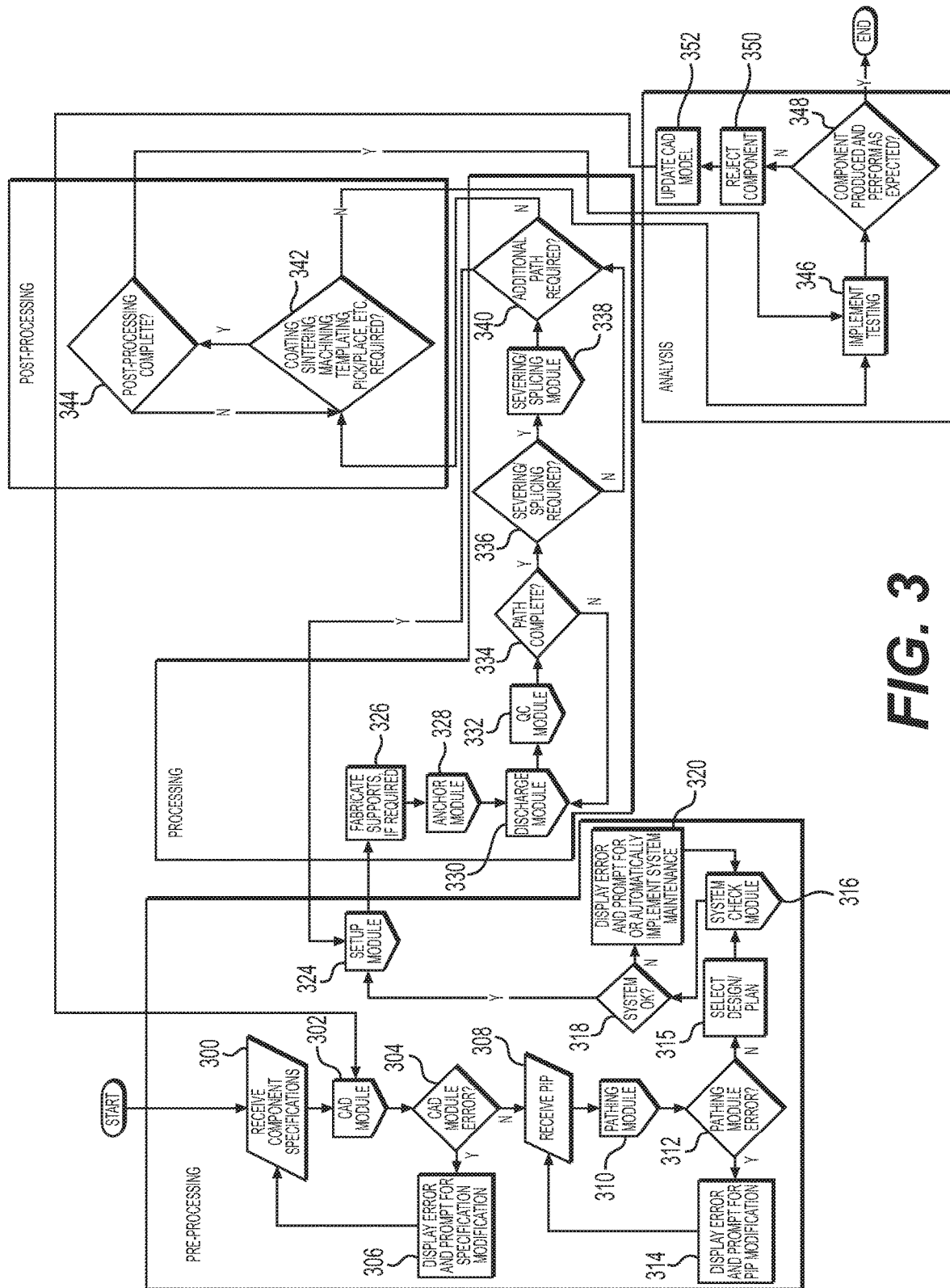
FIGS. 3-11 are flowcharts representing exemplary methods that may be implemented by the control system of FIGS. 1 and 2.

As can be seen in the flowchart of FIG. 3, the creation of structure 12 may generally be divided into four different phases, including: pre-processing, processing, post-processing, and analysis. The pre-processing phase may generally be associated with defining of structure 12. The processing phase may generally be associated with forming of at least a base portion of structure 12. The post-processing phase may generally be associated with final finishing of the base portion of structure 12. The analysis phase may generally be associated with comparing of the pre-processing definition of structure 12 with observations of a physical embodiment of structure 12, as well as iterative adjusting of the previous phase(s) based on the comparison.

The pre-processing phase of structure creation may begin with receipt by processor 36 (e.g., via I/O device(s) 38) of specifications from a user of system 10 (Step 300). These specifications may include, among other things, a physical envelope of structure 12 (e.g., an exterior surface definition of structure 12 and/or a definition of a space in which structure 12 is to reside and function), expected operating conditions (e.g., force loading, deflection loading, vibratory loading, thermal loading, environmental loading, etc.), desired characteristics (e.g., hardness, weight, buoyancy, etc.), and/or desired performance (e.g., minimum values, maximum values, and/or acceptable ranges for particular parameters, such as conductance, stiffness, strength, etc.). For example, a user of system 10 may input a mating interface definition that structure 12 should comply with in an associated assembly (e.g., a shape, size, location, and orientation of an end of a keyed axle on which the turbine wheel depicted in FIG. 1 should rotate), a maximum volume (e.g., axial and/or radial size limitations) that can be occupied by structure 12, levels of forces expected to pass through structure 12 in particular directions (e.g., a flowrate and density of gasses passing radially into and axially out of the turbine wheel and/or a resistive torque expected within the axle), and how structure 12 should respond to the forces (e.g., an amount of torque that should be generated within the turbine wheel by the gases and/or a maximum amount of stiffness and/or deflection allowed within each vane of the turbine wheel due to applied torques).

The specifications received at step 300 may then be fed into one or more CAD Modules (Step 302), which will be discussed in more detail below. The CAD Module(s) may return one or more possible designs (e.g., shapes, materials, fiber trajectories, fiber tension levels, densities, etc.) for structure 12 based on the received specifications, as long as one or more designs are possible for the given specifications. If computing device 16 determines that an error exists in association with the design(s) (Step 304), the error may be displayed to a user of system 10, along with a prompt for modification of the provided specifications (Step 306). Control may then return from Step 306 to Step 300.

Once any possible designs for structure 12 have been successfully returned by the CAD Module(s), computing device 16 may receive from the user a Print Information Packet ("PIP") (Step 308). The PIP may contain values for system 10 that can affect fabrication of structure 12. These values may include, for example, a current configuration of machine 14 (e.g., a type and/or condition of a particular nozzle module 24 connected to and/or available for use with machine 14), a type and/or amount of material (e.g., matrix and/or fiber) currently loaded into machine 14, a type and/or capability of support 18 connected to head 20, etc. For example, the user may indicate that nozzle module 24A is currently connected to machine 14, that 50 m of 4,000-tow carbon fiber is available and loaded into head 20, that matrix reservoir 26 is supplied with 6.2 L of a particular UV curable resin, and that support 18 is a 6-axis robotic arm having a particular range of motion, force, and/or speed. It is contemplated that, in some embodiments, this information may be automatically detectable and/or trackable by computing device 16 (e.g., via one or more peripherals 40), if desired. In these embodiments, Step 308 may be omitted.

The PIP and the one or more possible designs may be delivered to a Pathing Module (Step 310), which will be discussed in more detail below. The Pathing Module(s) may return one or more possible plans (e.g., sets of sequential tool paths) for fabricating the one or more design(s) of structure 12 based on the received PIP, as long as one or more plans are possible for the given PIP. If computing device 16 determines an error exists in association with the plan(s) (Step 312), the error may be displayed to the user of system 10, along with a prompt for modification of the provided PIP (Step 314). Control may then return from Step 314 to Step 308.

At any time during completion of Steps 302-312, one or more of the possible designs and/or plans generated by the CAD and/or Pathing Modules may be selected for use in fabricating structure 12 (Step 315). This selection may be manually completed by the user of system 10 (e.g., via I/O device(s) 38) or automatically by processor 36 (e.g., based on instructions stored in memory 42, based on a priority of the specifications received at Step 300, based on analysis of the design(s) and/or plan(s), and/or using one or more available optimization algorithms of apps 48). When a particular design is selected prior to Step 310, Step 310 may be completed with respect to only the selected design. In some instances, each possible design may need to be paired with one or more plans prior to optimization and/or selection.

After completion of Step 314, control may proceed to a System Check Module (Step 316), which may be responsible for checking operational readiness of system 10 (e.g., via peripherals 40). The System Check Module will be described in more detail below. If processor 36 determines an error exists in association with the system check (Step 318), the error may be displayed to the user of system 10, along with a prompt for modification of system parameters (Step 320). Control may then return from Step 320 to Step 316.

Once the readiness check of system 10 has been completed successfully, the selected design of structure 12, selected fabrication plan, and the PIP, may be provided to a Setup Module (Step 324) and the Processing Phase of structure fabrication may begin. The Setup Module may be responsible for setting up machine 14 to follow the selected plan and produce the selected design of structure 12 within the parameters of the PIP. The Setup Module will be described in more detail below.

If processor 36 determines (via the Pathing Module) that any temporary bracing or support is required, processor 36 may generate commands directed to machine 14 that cause machine 14 to fabricate the temporary bracing or support (Step 326) after machine 14 has been properly set up (e.g., after completion of step 324). For example, processor 36 may generate commands that cause at least a first output device of peripherals 40B (e.g., a fiber supply) to inhibit discharge of fibers from head 20; cause at least a second output device of peripherals 40B (e.g., a matrix supply) to allow discharge of only a temporary matrix (e.g., a matrix that can be rinsed away with water, air, or another solvent); cause at least a third output device of peripherals 40B (e.g., positioning motors associated with support 18) to move head 20 to a position corresponding with the required bracing or support location; and cause at least a fourth output device of peripherals 40B (e.g., cure enhancer 22) to activate and cure the temporary matrix discharging from head 20 during the movement of head 20 within an envelope of the temporary bracing or support.

Control may then proceed to an Anchor Module (Step 328), which may regulate anchoring of matrix-coated fibers to anchor point 32 (referring to FIG. 1) in preparation for discharge of a next path of material under the control of a Discharge Module (Step 330). Both of the Anchor and Discharge Modules will be explained in more detail below, along with a Quality Control Module that may implement a sub-routine during completion of each tool path to ensure that the matrix-coated fibers have been discharged according to the plan (Step 332).

Processor 36 may be configured to continuously monitor the discharge of material from head 20, not only for quality control purposes, but also to track the progress according to the selected plan. This monitoring may be completed, for example, based on signals received from one or more input devices of peripherals 40A. Processor 36 may determine when a current tool path in the plan is complete (e.g., by comparing a current position of head 20 to an end position in the tool path—Step 334), and thereafter determine if severing and/or splicing of any fibers extending from head 20 is required (Step 336). Severing of the fibers may be required when a next tool path in the plan for structure 12 does not start at the termination point of the current tool path. For example, if head 20 must be moved prior to further discharge of additional material, processor 36 may determine that severing is required. Splicing of the fibers may be required if the fibers in the next tool path are different from the fibers in the current tool path.

When severing and/or splicing is required, control may proceed to a Severing/Splicing Module (Step 338), after which processor 36 may determine if any additional tool paths are required to complete fabrication of structure 12 (Step 340). If no severing or splicing is required, control may advance directly from Step 336 to Step 340. Processor 36 may determine that additional tool paths are required, for example, based on comparison of any completed tool paths with a number and/or identification of tool paths included within the fabrication plan for structure 12. When additional tool paths are required, control may return from Step 340 to Step 324. Otherwise, the Processing Phase may be considered complete.

The Post-Processing Phase may begin with processor 36 determining if the plan for fabrication of structure 12 calls for any post-processing activities (e.g., coating, sintering, machining, templating, electronics pick/place, etc.). When any of these activities are specified in the plan for fabrication of structure 12, control may advance from Step 342 to Step 344, where the activities are then completed. When post-processing activities are not required or after any required activities have been completed, the Analysis Phase may begin.

The Analysis Phase may begin with testing of the just-fabricated structure 12 (Step 346). The testing may correspond with the specifications received at Step 300 and include, for example, hardness testing, strain testing, continuity testing, weight testing, buoyancy testing, etc. Results from the testing may then be compared to the specifications (Step 348) to determine if structure 12 has satisfied the corresponding requirements. If the requirements have not been adequately satisfied, structure 12 may be rejected (Step 350), the CAD Module may be updated (Step 352), and control may return to Step 302. Updating of the CAD Module may include, among other things, adjustments of data 46 and/or associated maps/algorithms (e.g., adjustments of hardness relationships, tensile relationships, density relationships, material-type relationships, processing parameter relationships, etc.) that are stored within memory 42 and relied upon by apps 48 to generate the possible designs, to generate the possible plans, and/or to optimize the designs and plans. When the requirements of structure 12 have been proven satisfied, structure 12 may be accepted and the process may be repeated to fabricate another unit of structure 12.

Figure 4:
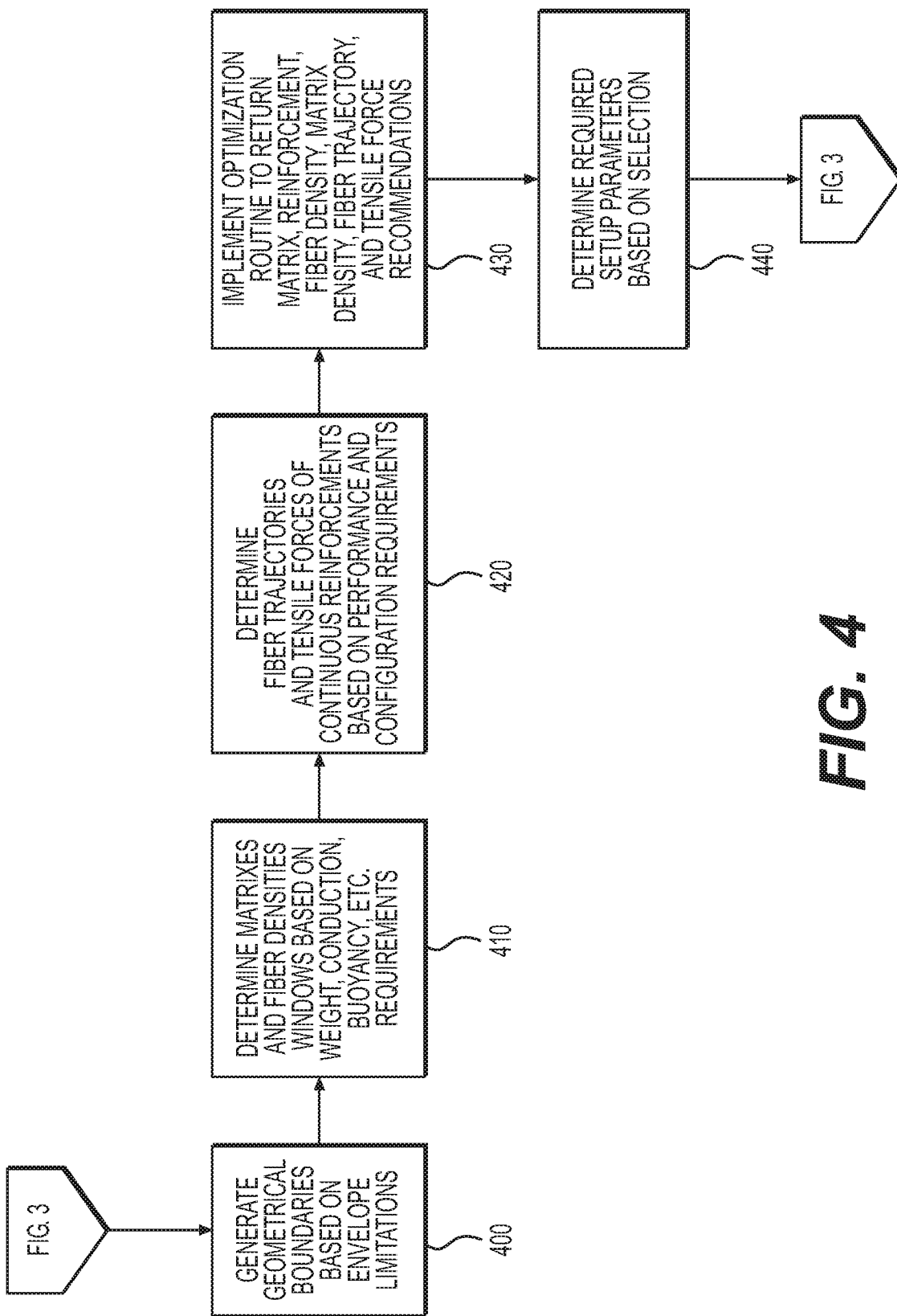

Returning to the CAD Module shown in FIG. 4, processor 36 may generate the possible design(s) of structure 12 in multiple different steps, some of which may be performed in any order. One of these steps (i.e., Step 400) may include, for example, generation of boundaries (e.g., exterior surfaces) of structure 12 based, at least in part, on envelope limitations provided by the user at Step 300 (referring to FIG. 3). In the provided example of the turbine wheel (referring to FIG. 1), the envelope limitations may include bounding axial planes marking limits beyond which the turbine wheel may not extend in an axial direction; an inner radial limit (e.g., the axle interface described above); and an outer radial limit (e.g., the inner surface of an associated shroud, including space for a desired annular airflow gap). Processor 36 may then generate virtual surfaces at these boundary limitations, and create iterative designs having virtual surfaces spaced at decreasing incremental offsets from these limitations. It is also contemplated that the virtual surfaces could alternatively be created at innermost boundary limits, and iteratively moved outward by increasing incremental offsets, if desired. Detailed features of structure 12 (e.g., vanes of the turbine wheel) may then be formed within these virtual surfaces, and numbers of and spacing between the features may be incrementally varied to produce a range of different spatial layouts. For example, the turbine wheel could be designed to have a greater or lesser number of thicker or thinner vanes, with larger or smaller radial gaps therebetween.

In conjunction with the different spatial layouts of structure 12 created at Step 400, processor 36 may determine any number of different matrixes, fibers, and/or fiber densities that could be used to fabricate the different designs while still providing the characteristics specified by the user at Step 300. For example, for any given one of the spatial layouts generated at Step 400, there may be one or more matrixes, one or more fibers, and/or one or more densities that allow the given spatial layout to be within a weight guideline, provide a desired level of electrical insulation or conductivity, provide a desired buoyancy, etc. These windows of matrixes, fibers, and/or densities may be paired with each of the different spatial layouts.

Processor 36 may then determine a trajectory of one or more of the fiber types that were previously determined to be available for each spatial layout, as well as a level of residual tension that should be present within each fiber (Step 420). This determination may be made, for example, based at least partially on the loading conditions and/or the desired performance specified at Step 300. For example, in order to provide a desired level of stiffness, strength, vibratory response, etc., within the vanes of the turbine wheel, a particular number/density of first fibers may need to be provided with a first tensile vector at a first location in order for the desired performance to be provided; while a particular number/density of second fibers may need to be provided with a second tensile vector at a second location in order for the same performance to be provided. These parameters may be determined by processor 36 for each matrix/fiber combination within each of the possible spatial layouts. The fiber parameters may be determined, for example, via iterative use of finite element analysis algorithms (e.g., via apps 48).

In some instances, the level of tension within particular fibers may be less important. In these instances, the tensile vector may still specify a positive value that is just above a minimum level (e.g., just above zero).

In some embodiments, one or more optimization routines may then be implemented by processor 36 to narrow down the range of different design combinations and/or to provide a recommendation to the user of a particular design (Step 430). The optimization may be performed, for example, based on a user-defined priority of the given specifications. For example, in some instances, a footprint of structure 12 may be most important, followed by weight, followed by performance, followed by cost; while in other instances, cost may be more important than the footprint, and weight the least important. Processor 36 may be configured to selectively implement the optimization routines (e.g., using apps 48), and provide the results to the user for final selection of a particular design (e.g., via display 34). In some instances, processor 36 may automatically select the design that best fits the required specifications.

In some instances, it may not be possible to generate a design that satisfies all of the user-specified requirements. In these instances, processor 36 may return the error subsequently shown on display 34 (referring to FIG. 1) at Step 306 (referring to FIG. 3). It is also contemplated that processor 36 may not be able to automatically design all features of structure 12. For example, the user may need to generate and/or refine some features manually. It is further contemplated that processor 36 may not implement any kind of design/selection/optimization/recommendation process and that the PIP may simply include all information required to produce a specific design of structure 12.

Once a particular design has been selected (e.g., manually selected by the user via I/O devices 38 or automatically selected by processor 36), processor 36 may determine a particular setup of machine 14 required to fabricate the selected design. For example, processor 36 may determine a minimum quantity of fiber (e.g., at least 25% more than specified for the design) required to produce the design; a minimum volume of matrix (e.g., at least 25% more than specified for the design); a particular nozzle module(s) 24 that must be connected to head 20 (e.g., based on a number of fibers in a particular reinforcement, a fiber diameter, a fiber shape, a fiber type, a matrix viscosity, a matrix flow rate, etc.); a required arrangement (e.g., number, orientation, intensity, etc.) of cure enhancer(s) 20; required use of energy blocker 30 and/or optics 31; required ranges of motion, speed, and/or force from support 18; etc. This information (which can be packaged together as basic operational information—"BOI") may be later fed into the Setup Module at Step 324 (referring to FIG. 3).

Figure 5:
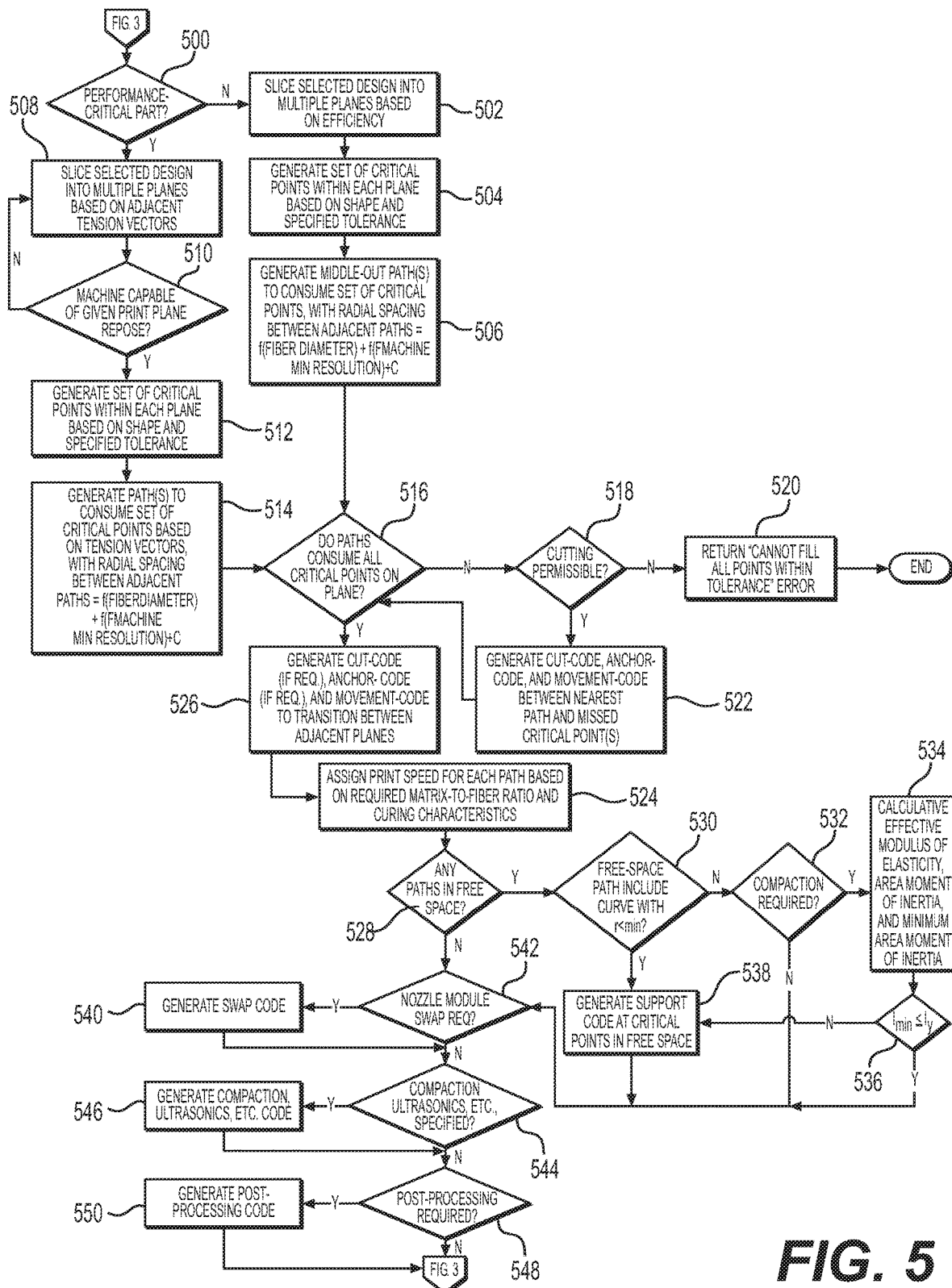

Returning to the Pathing Module shown in FIG. 5, processor 36 may generate any number of possible plans for fabricating the selected design of structure 12. Each plan may include, among other things, a number of individual tool paths that together form structure 12, as well as a sequence and/or timing of each path. Processor 36 follow an optimization and/or selection process (e.g., based on time, material usage, cost, appearance, etc.) similar to that described above in regard to the possible design, in order to provide a recommendation and/or to automatically select one of the plans for execution.

To generate each plan, processor 36 may begin by executing the Pathing Module shown in FIG. 5. For example, processor 36 may determine if structure 12 is a performance-critical part (Step 500). In particular, some structures 12 may not have strength, stiffness, continuity, and/or other similar specifications. In these embodiments, the location of fibers and/or the way in which structure 12 is fabricated may be less important and structure 12 may be considered not to be a performance-critical part. In other embodiments, specifications for strength, stiffness, continuity, etc. may exist, but the values may be lower than established thresholds values (e.g., values associated with selected matrixes, fibers, densities, and/or shapes), also allowing processor 36 to consider the corresponding structure not a performance-critical part. In these embodiments, processor 36 may slice a virtual model of structure 12 into any number of sequentially executable planes having any orientation that promotes fabrication efficiency (Step 502). For example, processor 36 may slice the virtual model into horizontal, parallel, and overlapping layers. For the purposes of this disclosure, the term "sequentially executable planes" may refer to a set of planes or layers of structure 12 that can be fabricated in sequence without inhibiting access to another plane further down in the sequence.

Figure 13:
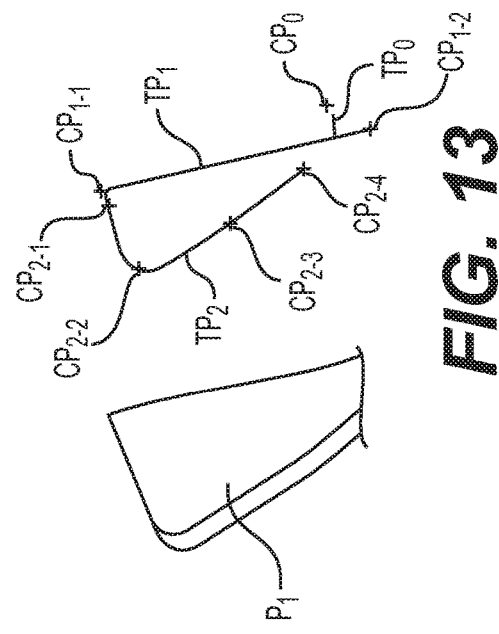

For each of these layers (e.g., $P_1$— see FIG. 13), processor 36 may generate a set of critical points (e.g., $CP_{1-1}$, $CP_{1-2}$; $CP_{2-1}$, $CP_{2-2}$, $CP_{2-3}$, $CP_{2-4}$—see FIG. 13) based on the envelope (e.g., required shape and/or size) of structure 12 and a specified tolerance zone for the envelope (Step 504). The points included within the set may be considered critical when material must pass through the points (and in a particular trajectory between the points) in order for the required shape of structure 12 to be fabricated, within the specified tolerance zone. For example, a straight tool path of material (e.g., $TP_1$—see FIG. 13) within structure 12 along a surface wall or edge may require two critical points (e.g., a starting point and an ending point), while a curved tool path (e.g., $TP_2$—see FIG. 13) may require three or more critical points. In general, tighter tolerances may require a higher number of critical points to define the shape of structure 12.

Once the set of points within each layer of structure 12 has been generated, processor 36 may generate one or more tool paths that connect the different points in the set (Step 506). In general, a tool path may be considered a continuous track between points that does not require nozzle module 24 to move without discharging material (e.g., to reposition for a next discharging event). In one embodiment, the tool path(s) may be organized in a middle-out arrangement. For example, the tool path(s) may begin at a general center of a given plane, move in a first direction until the tool path passes through a first critical point at an edge or surface of structure 12, turn through a specified angle (e.g., about 90°) in a specified direction (e.g., clockwise), and move in a second direction until the tool path passes through a second critical point at another edge or surface of structure 12. This process may be repeated, until all critical points in a given plane have been consumed by the associated tool paths of that plane. In some instances, rather than linear segments joined to each other at 900 corners, the paths could instead or additionally include arcuate segments arranged in an outwardly spiraling pattern. Each time that nozzle module 24 is required to move without discharging material, the current tool path may be terminated and a new path initiated.

Each tool path or segment of a tool path may be located adjacent another tool path or segment of the same tool path, and radially spaced from each other by a specified distance. This distance may be, for example, a function of fiber size (e.g., diameter or other cross-sectional distance), a function of machine resolution (e.g., a minimum step in the radial direction), and/or a constant value determined through lab testing. The distance may be measured, for example, as a straight line between centers of the adjacent tool paths.

Figure 12:
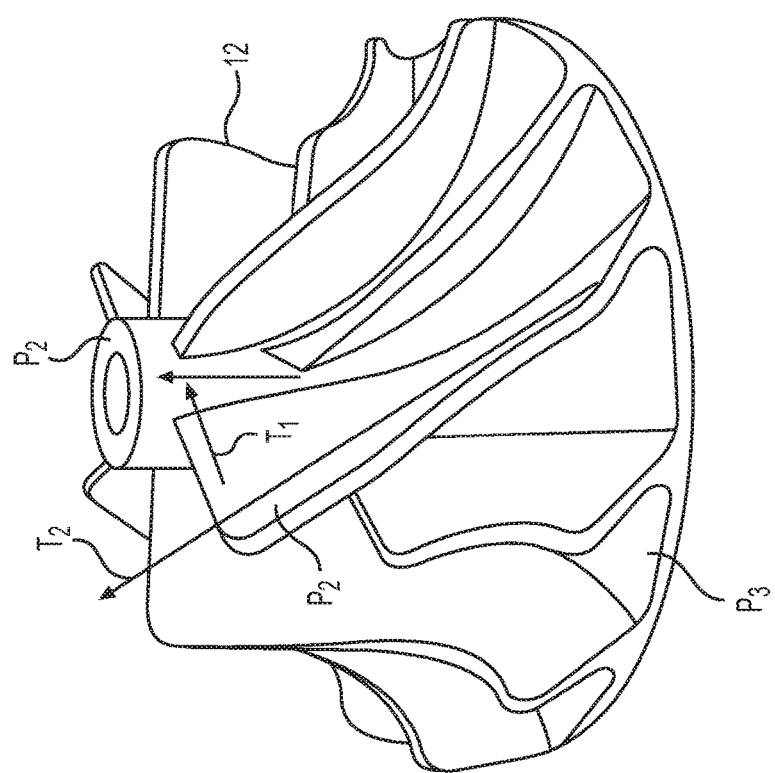
FIGS. 12 and 13 are diagrammatic illustrations depicting progression through steps in the methods of FIGS. 3-11.

Returning to Step 500, when processor 36 determines that the structure 12 to be fabricated is a performance-critical part (e.g., based on anticipated loading of structure 12 and/or performance specifications for given loading conditions), processor 36 may implement a slicing technique different from the one described above. For example, processor 36 may slice structure 12 into one or more sequentially executable planes (e.g., $P_1$, $P_2$, $P_3$, etc.—see FIG. 12) that are not necessarily parallel to each other, horizontal, or overlapping. Instead, processor 36 may slice structure 12 into one or more planes that are each formed by two or more of the tension vectors (e.g., $T_1$, $T_2$, etc.—see FIG. 12) described above (e.g., by adjacent tension vectors and/or by tension vectors that are generally parallel with each other and proximate within a threshold distance) (Step 508).

In some situations, the sequentially executable planes generated at Step 508 may not be within the capabilities of machine 14 to fabricate. For example, the planes may be at angles not achievable by support 18 and/or within spaces too small for nozzle module 24. Accordingly, processor 36 may be configured to compare parameters of each plane generated at Step 508 with known capabilities of machine 14 (Step 510), and to reject any planes that exceed the capabilities of machine 14. For example, control may return from Step 510 to Step 508 for generation of replacement planes, when processor 36 determines that any of the previously generated planes fall outside the capabilities of machine 14. Following Step 510, a Step 512 that is substantially identical to Step 504 may be completed.

Once a set of critical points has been generated for each plane or layer of structure 12, processor 36 may generate one or more tool paths for each plane that consumes the critical points (Step 514). In contrast to Step 506 described above, processor 36 may generate the tool path(s) at Step 514 based not primarily on efficiency, but more on the tension vectors described above. In particular, the tension vectors may generally lie along the axes of fibers contained within each path and/or be resultants of two or more co-located fibers (e.g., fibers within the same path, fibers within adjacent tool paths, fibers within the same plane, and/or fibers within adjacent planes). In this way, the required tension vectors may be created by the tool paths generated at Step 512. In most embodiments, the tool paths generated at Step 514 will not follow the middle-out approach described above.

After creation of the tool paths for a given plane or layer of structure 12 (e.g., after completion of Steps 506 and/or 514), processor 36 may determine if all of the critical points in that plane have been consumed (e.g., included within a path) (Step 516). In particular, there may be planes that contain one or more outlier critical points (e.g., $CP_O$—see FIG. 13) that are difficult to include in an existing tool path that extends through another non-outlier critical point. In these situations, additional tool paths ($TP_O$—see FIG. 13) must be generated that consume the outlier critical points and connect these points to the rest of structure 12. To generate these additional tool paths, processor 36 must first determine if fiber cutting is permissible (e.g., based on performance specifications, continuity specifications, etc.) (Step 518). If cutting is not permissible, nozzle module 24 may be unable to move from the end of an existing tool path to the start of the additional tool path, without discharging material during the move. In this situation, processor 36 may cause an error message to be shown on display 34, and the current fabrication process may end.

However, when processor 36 determines that cutting is permissible, processor 36 may generate cut-code for the end of the existing tool path, generate anchor-code for the start of the additional tool path, and generate movement-code for transitioning between the existing tool path and the additional tool path (Step 522). The additional path may be anchored (e.g., start at) at a location nearest the outlier critical point that is on the existing path. It should be noted that processor 36 may also generate cut-, anchor-, and movement-code during transitioning between existing paths (i.e., paths that do not include outlier critical points) at Step 522.

Returning to Step 516, when processor 36 determines that no critical points were missed during path generation, processor 36 may generate cut-code for the end of a final path within a given plane or layer of structure 12, generate anchor-code for the start of a first path in a new plane, and generate movement-code for transitioning between the final path and the first path (Step 526).

Once all paths in each plane or layer of structure 12 have been generated, processor 36 may assign print speeds and cure parameters (e.g., operational parameters of cure enhancers 22, such as angle, intensity, wavelength, etc.) for each path, for each segment of each path (Step 524), and/or for each transition movement described above. These assignments may be made, for example, based on a required matrix-to-fiber ratio, a required density, a required cure amount or hardness specifications for structure 12, and/or a required fabrication time.

After generation of all required paths, processor 36 may determine if any of the paths are to be formed in free space (Step 528). For the purposes of this disclosure, a path is considered to be formed in free space when at least a portion of the path does not lie directly on top of (e.g., overlap) a previously discharged path of material. When a path is formed in free space, in some situations, the path may need to be braced or supported to inhibit deviation from a desired location during curing.

When processor 36 determines that a path is to be formed in free space, processor 36 may determine if that path includes curvature having a radius less than a minimum threshold (Step 530). It has been determined that gentle curves within a given path (e.g., curves having a radius greater than the minimum threshold) are less prone to deviation from their desired locations during curing and/or during subsequent movement of nozzle module 24 (e.g., when fibers are pulled by nozzle module 24 moving away from the unsupported segment of the free-space path). In these situations, processor 36 may not always generate code for fabrication of bracing or supports. Instead, processor 36 may determine if the unsupported segment of the curving path is to be compacted (Step 532), and then estimate if such a compaction could cause undesired deviations. For example, when compaction of a particular level is specified for the unsupported and curving segment of the free-space path, processor 36 may estimate the segment's stiffness and/or strength (e.g., calculate an Area of Moment of Inertia $I_y$ and a Minimum Area Moment of Inertia $I_{min}$ based on the Effective Modulus of Elasticity $E_{avg}$ for the segment—Step 534), and then compare the stiffness and/or strength to a stiffness and/or strength required to resist deviation from the planned location during compaction (Step 536). For example, when the Minimum Area Moment of Inertia is less than or equal to the Area of Moment of Inertia, structure 12 may be determined to be adequately stiff and/or strong, and no bracing or supports for the free-space path may be required. However, when the Minimum Area Moment of Inertia is greater than the Area Moment of Inertia, processor 36 may generate bracing or support fabrication code associated with the unsupported segment of the free-space path (Step 538). Returning to Step 530, any time that the radius of curvature of a given path is less than the minimum threshold, control may proceed directly to Step 538 for generation of bracing or support fabrication code.

In some embodiments, the paths generated at Steps 506, 508, and/or 522 described above may require the use of multiple different nozzle modules 24. For example, larger planes may include a single path fabricated using ribbon material, while smaller planes and/or paths within the same plan may require single-track material. In these instances, nozzle module 24B (referring to FIG. 1) may need to be swapped out for nozzle module 24A in order for the paths to fabricated as planned. In this example, processor 36 may be configured to determine the need for swapping of nozzle modules 24 (e.g., based on comparisons of sizes, locations, orientations, fiber types, etc. of planned paths with known capabilities of nozzle modules 24) (Step 540), and selectively generate corresponding code for the swap (e.g., for automated swapping and/or for pausing and allowing of manual swapping—Step 542).

It is also contemplated that, rather than swapping one nozzle module 24 for another nozzle module 24 connected to the same support 18, multiple nozzle modules 24 may be used at the same time. For example, processor 36 could be connected to multiple machines 14 and, instead of calling for nozzle module swapping to fabricate different paths and/or layers of structure 12, processor 36 could instead selectively assign different machines 14 to fabricate particular paths and/or layers of the same structure 12. In this example, processor 36 may track the operation (e.g., location) of each nozzle module 24, and coordinate operations to avoid collisions and/or to cooperatively complete fabrication of a particular feature. During this cooperative fabrication, the various machines 14 could be identical; have different supports 18, heads 20, and/or nozzle modules 24; and/or have different purposes and assigned tasks. For example, a first machine 14 may be a primary path generating machine, while a second machine 14 may be an outlier critical point machine, while a third machine 14 may be a repair or splicing machine, while a fourth machine 14 could be a post-processing machine, etc. Other machine configurations may also be possible, and the same processor 36 or communicatively coupled processors 36 could be used to control the different machines 14.

When processor 36 determines that compaction, ultrasonics, or another auxiliary fabrication process is specified for a given segment of any path, processor 36 may generate the corresponding code at any time during execution of the Pathing Module (Steps 544 and 546). Similarly, when processor 36 determines that post-processing (e.g., machining, coating, painting, cleaning, etc.) is specified for a given segment of any path, processor 36 may generate the corresponding code at any time during execution of the Pathing Module (Steps 548 and 550).

Figure 6:
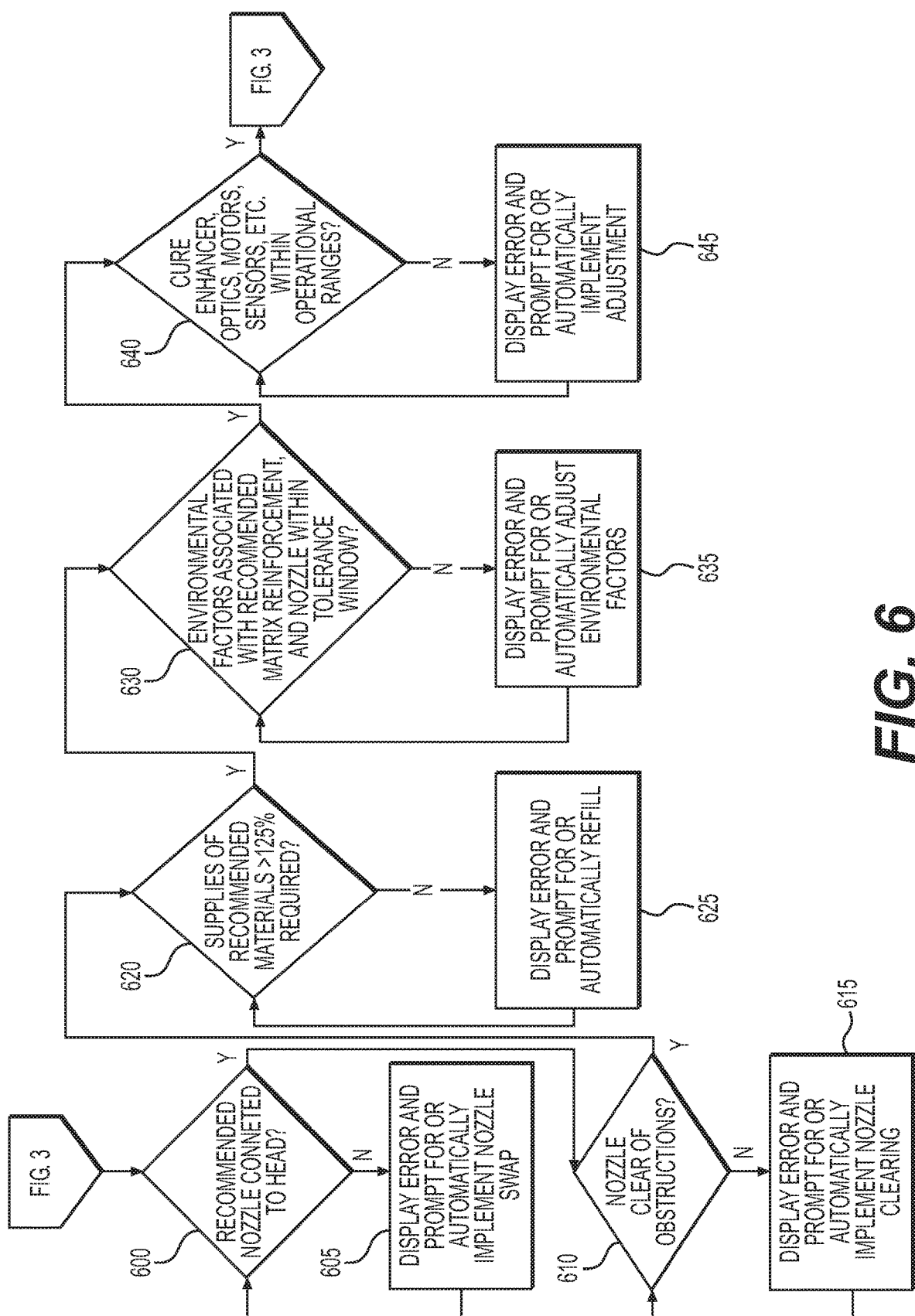

Returning to the System Check Module shown in FIG. 6, processor 36 may implement a procedure to help ensure that machine 14 is ready to execute the selected plan and fabricate the selected design of structure 12. This procedure may include a number of different steps, which may be implemented in any desired order. One of these steps may include determining if the particular nozzle module 24 required to produce the design is currently connected to head 20 (Step 600). In one embodiment, this determination may be made, for example, based at least in part on input from the user that is indicative of the identity of the connected nozzle module 24. In another embodiment, processor 36 may automatically detect (e.g., based on captured images, signals, settings, detected parameters, etc. generated by one or more of input devices of peripherals 40A) the currently connected nozzle module 24 and compare the detected nozzle module 24 to the required nozzle module 24. If the currently connected nozzle module 24 is not the required nozzle module 24, processor 36 may display an error signal to the user (e.g., via display 34), thereby prompting the user to swap out the current nozzle module 24 for the correct nozzle module 24 (Step 605). Alternatively, processor 36 may automatically swap out the current nozzle module 24. This may be accomplished, for example, by commanding support 18 (i.e., by commanding actuators, motors, and/or other output devices of peripherals 40B associated with support 18) to move head 20 to a drop location, commanding release of the currently connected nozzle module 24, commanding support 18 to move head 20 to a pickup location, and commanding engagement of support 18 with the required nozzle module 24. When processor 36 determines at Step 600 that the correct nozzle module 24 is connected to head 20, Step 605 may be omitted.

Once the correct nozzle module 24 is connected to head 20, processor 36 may determine if the corresponding nozzle tip is clear of obstructions (Step 610). This may be accomplished, for example, by receipt of visual confirmation by a user, by automated visual or vibratory confirmation (e.g., via one or more input devices of peripherals 40A), and/or by implementing a specific nozzle tip test. The nozzle tip test may include commanding a test amount of matrix to be discharged from the nozzle tip (e.g., by causing head 20 to move away from anchor point 32 by a particular distance), monitoring a corresponding flow rate of matrix (e.g., a level change of matrix in reservoir 26), and comparing the monitored flow rate to an expected flow rate (i.e., a rate calculated as a function of the commanded movement distance, a known nozzle opening area, a cross-sectional area of an associated fibers, and a known viscosity of the matrix). If the monitored rate is significantly less than (e.g., 90% or less of) the expected flow rate, the nozzle tip may be considered at least partially clogged. When this occurs, processor 36 may display an error signal to the user (e.g., via display 34), thereby prompting the user to swap out the current nozzle module 24 for another similar nozzle module 24 and/or to implement a clearing process (Step 615). Processor 36 may alternatively implement the swap and/or clearing process automatically, if desired. When processor 36 determines that the nozzle tip is adequately clear of obstruction, Step 615 may be omitted.

Another step in the procedure performed by the System Check Module may include determining if a sufficient supply of matrix and/or fiber is currently provided to head 20 (Step 620). In one embodiment, this determination may be made, for example, based at least in part on input from the user that is indicative of an amount of matrix and/or fiber in, on or otherwise being passed to head 20. Specifically, processor 36 may compare this amount with the amount stipulated at Step 302 to determine if at least 25% more than required to make structure 12 is currently available. It is contemplated that processor 36 may additionally or alternatively track supply and usage of matrix and/or fiber (e.g., via one or more input and/or output devices of peripherals 40), and compare an amount consumed with an amount supplied and the amount required to determine if at least 25% more than required to make structure 12 is currently available. When less than 125% of the required amount of matrix and/or fiber is currently available, processor 36 may display an error signal to the user (e.g., via display 34), thereby prompting the user to refill the corresponding supply of matrix and/or fiber (Step 625). Processor 36 may alternatively implement an automated replenishment process, if desired. When processor 36 determines that sufficient material is available, Step 625 may be omitted.

It is contemplated that, in some embodiments, the automated replenishment process may involve more than just providing additional material to head 20. For example, there may be instances where a significant amount of fiber is available to head 20, but still not enough to complete structure 12. In these instances, processor 36 may not simply supply more fiber to head 20. Instead, Step 625 may additionally include planning of a splice location at a particular progress point within structure 12 (e.g., at a feature or trajectory change), and thereafter (e.g., during completion of Steps 336 and 338—referring to FIG. 3) selectively activating an input device of peripherals 40A (e.g., the splicer) to dynamically swap out a first supply of fiber with a replacement supply of the same or a different fiber.

Another step in the procedure performed by the System Check Module may include determining if environmental factors associated with the intended-use matrix, fiber, and/or nozzle module 24 are within a corresponding tolerance window (Step 630). In one embodiment, this determination may be made, for example, based at least in part on input from the user that is indicative of what matrix, fiber, and/or nozzle module 24 are in use and/or what environmental factors should be used in association with these elements. Specifically, processor 36 may compare this information with monitored conditions (e.g., temperature, humidity, build area gas composition, etc.—monitored via one or more input devices of peripherals 40A) to determine if the environment of machine 14 is conducive to structure fabrication. It is contemplated that processor 36 may additionally or alternatively have stored in memory relationships between different matrixes, fibers, and/or nozzle modules 24, and automatically reference this information during the above-described comparison. When current environmental factors are not within acceptable ranges for producing a given design of structure 12 with a particular matrix, fiber, and/or nozzle module 24, processor 36 may display an error signal to the user (e.g., via display 34), thereby prompting the user to adjust the environmental factors (Step 635). Processor 36 may alternatively implement an automated adjustment process, if desired. When processor 36 determines that the environmental factors are acceptable, Step 635 may be omitted.

Another step in the procedure performed by the System Check Module may include determining if output devices of peripherals 40 (e.g., cure enhancer 22, optics 31, support actuators, sensors, actuators, motors, etc.) are fully functional and within desired operating ranges (Step 640). In one embodiment, this determination may be made, for example, based at least in part on input from the user that is indicative of known functionalities of particular components. It is contemplated that processor 36 may additionally or alternatively have stored in memory operational statuses and/or acceptable operating ranges of particular components, and automatically reference this information within sensory data and/or feedback provided via peripherals 40. When one or more components of machine 14 are not fully functional or functional within acceptable ranges, processor 36 may display an error signal to the user (e.g., via display 34), thereby prompting the user to adjust (e.g., service or replace) the corresponding components (Step 645). Processor 36 may alternatively implement an automated adjustment process, if desired. When processor 36 determines that all components of machine 14 are fully functional, Step 645 may be omitted.

Figure 7:
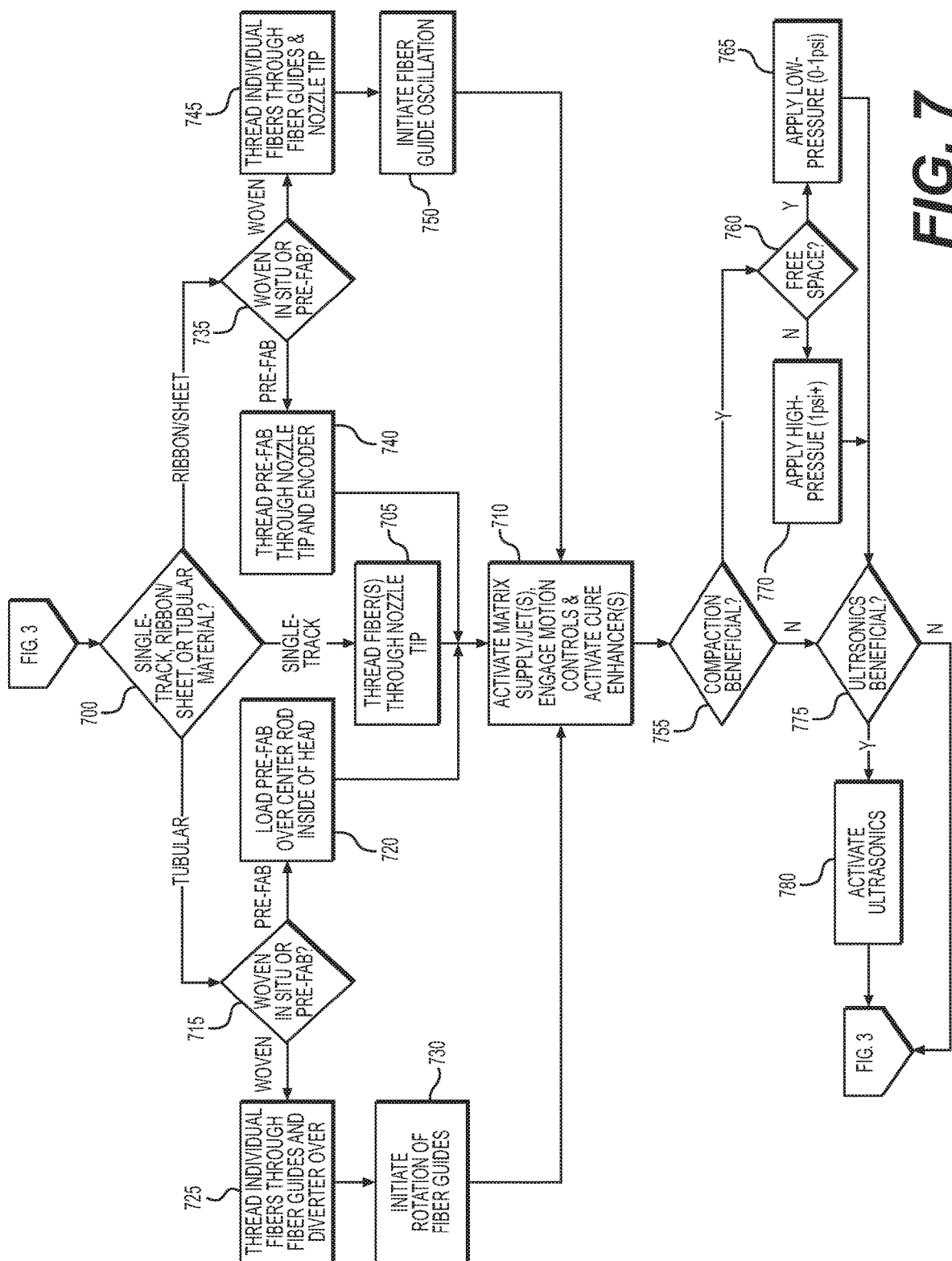

Returning to the Setup Module shown in FIG. 7, processor 36 may implement a procedure to set up machine 14 according to the selected plan for fabricating the selected design of structure 12. This procedure may include a number of different steps, which may be implemented in any desired order. One of these steps may include determining if the selected plan calls use of a single-track material (e.g., material having one or more continuous fibers with a generally circular cross-section and a closed center), ribbon or sheet material (e.g., material having one or more continuous fibers with a generally rectangular cross-section), or tubular material (e.g., material having one or more continuous fibers with a generally circular cross-section and an open center) (Step 700). When the fabrication plan calls for the use of single-track material, processor 36 may implement automatic fiber-threading of nozzle module 24 or allow for manual fiber-threading (Step 705). Automated threading may be implemented, for example, by processor 36 selectively activating one or more of peripherals 40 to cause an amount of coated reinforcement to be feed into nozzle module 24, at least partially hardened (e.g., via one or more internal cure enhancers 22) and/or shaped (e.g., via a needle-shaped die), and then advanced through the tip of nozzle module 24. Once the required fibers have been threaded through nozzle module 24, processor 36 may selectively activate any other output devices of peripherals 40B required during material discharge (Step 710). These peripherals 40B may include, for example, matrix supply jets, actuators and/or motors associated with movement of support 18, cure enhancers 22, optics 31, etc.

Returning to Step 700, when processor 36 determines that the fabrication plan calls for use of tubular material, processor 36 may determine if the material is prefabricated (e.g., pre-woven into a tubular structure prior to introduction into head 20) or will be woven in-situ (Step 715). When the tubular material is prefabricated, processor 36 may implement automatic fiber-loading of head 20 or allow for manual fiber-loading (Step 720). Automated loading may be implemented, for example, by processor 36 selectively activating one or more output devices of peripherals 40B to cause an amount of the prefabricated material to be drawn or pushed (e.g., via one or more feed rollers) into matrix reservoir 26 over a centrally located guide rod (not shown) and compressed axially, before attachment of nozzle module 24 to matrix reservoir 26. A lower end of the material may protrude through nozzle module 24 at this time. Once the required fibers have been threaded through nozzle module 24, control may proceed to Step 710 described above.

When the tubular material is to be woven in-situ, processor 36 may implement automatic fiber-threading of any number of moveable (e.g., oscillating and/or rotating) fiber guides within head 20 or allow for manual fiber-threading of the guides (Step 725). Automated threading may be implemented in much the same way described above with respect to Step 710, and then the fibers may be pushed radially outward around a diverter located at a mouth of nozzle module 24. Once the required fibers have been threaded through the fiber guides and around the diverter, movement of the fiber guides may be initiated to start weaving of the fibers (Step 730), and control may proceed to Step 710 described above.

Returning to Step 700, when processor 36 determines that the fabrication plan calls for use of ribbon or sheet material, processor 36 may determine if the material is prefabricated (e.g., pre-woven into a rectangular structure prior to introduction into head 20) or will be woven in-situ (Step 735). When the rectangular material is prefabricated, processor 36 may implement automatic fiber-threading of nozzle module 24 or allow for manual fiber-threading (Step 740). Automated threading may be implemented, for example, by processor 36 selectively activating one or more output devices of peripherals 40B to cause a supply of the prefabricated material to be drawn or pushed (e.g., via one or more feed rollers in response to feedback from one or more rotary encoders) through matrix reservoir 26 and out through a tip of nozzle module 24. A lower end of the material may protrude through the tip of nozzle module 24 at this time. Once the required fibers have been threaded through nozzle module 24, control may proceed to Step 710 described above.

When the tubular material is to be woven in-situ, processor 36 may implement automatic fiber-threading of any number of moveable (e.g., oscillating and/or rotating) fiber guides within head 20 or allow for manual fiber-threading of the guides (Step 745). Automated threading may be implemented in much the same way described above with respect to Step 710, and then the fibers may be pushed axially through one or more adjacent channels located at the mouth of nozzle module 24. Once the required fibers have been threaded through the fiber guides and out nozzle module 24, movement of the fiber guides may be initiated to start weaving of the fibers (Step 750), and control may proceed to Step 710 described above.

As part of setting up machine 14 to discharge composite material, processor 36 may determine if compaction of the material would be beneficial after the discharge (Step 755). This determination may be made in any number of different ways. For example, the determination may be made based on stipulations of the fabrication plan required to meet associated strength or stiffness requirements. Alternatively, the determination of Step 755 may be made based on comparison of other fabrication conditions (e.g., steps between overlapping layers, material densities, material types, cure levels, etc.) with one or more conditions stored in memory. In yet another embodiment, the determination may be made based on observations (e.g., based on scanned images generated via one or more input devices of peripherals 40A that correspond with a rough surface) of discharged material.

Regardless of how the determination of Step 755 is made, processor 36 may need to determine how the compaction should be applied at any given location of structure 14. For example, processor 36 may determine if the compaction is required on a layer of material discharged into free space or only a layer that overlaps another layer (e.g., a previously discharged layer, an anchor surface, etc.) (Step 760). This determination may be made, for example, based on stipulations of the fabrication plan and/or scanned images of the discharged material showing included or a lack of support). When the material requiring compaction is discharged into free space, a lower level of compaction may be implemented by processor 36 (e.g., via selective activation of one or more output devices of peripherals 40B) (Step 765). In one embodiment, this lower level of compaction may be a level that provides desired compaction without causing deviation of the material from a desired trajectory. For example, this lower level of compaction may be about 0-1 psi. When the material requiring compaction is discharged on top of another layer, a higher level of compaction may be implemented by processor 36 (Step 770). In one embodiment, this higher level of compaction may be about 1 psi or greater and oriented in a direction through the material toward the support located at an opposing side of the material.

In the disclosed embodiments, the varying levels of compaction may be provided by selectively adjusting a negative offset distance that the associated output device of peripherals 40B push into the discharged path of composite material. In other embodiments, the varying levels of compaction may be provided by adjusting a force of the associated output device of peripherals 40B (e.g., by adjusting a level of electrical or hydraulic power provided to the output device). In yet other embodiments, a first output device of peripherals 40B may be selectively activated provide the lower level of compaction, while a second output device of peripherals 40B may be selectively activated to provide the higher level of compaction. In some embodiments, for example when the layer of material being compacted is non-planar (e.g., curved), processor 36 may need to regulate motion of an associated compacting device (e.g., of a roller or shoe, via selective activation of one or more output devices of peripherals 40B) to follow the surface topology.

At any point during operation of the Setup Module, processor 36 may determine if ultrasonics (i.e., ultrasonic vibrations induced within head 20) would be beneficial (Step 775). This determination may be made in any number of different ways. For example, the determination may be made based on stipulations of the fabrication plan. Alternatively, the determination of Step 775 may be made based on comparison of other fabrication conditions (e.g., steps between overlapping layers, material densities and/or viscosities, material types, cure levels, etc.) with one or more conditions stored in memory. In yet another embodiment, the determination may be made based on observations (e.g., scanned images) of discharged material. Use of ultrasonics may improve fiber-to-fiber adhesion, reduce bubble formation within the matrix, and/or improve fiber impregnation. When processor 36 determines that ultrasonics may be beneficial, processor 36 may selectively activate one or more output devices of peripherals 40B to generate corresponding ultrasonic vibrations within head 20 during discharge of composite material.

Figure 8:
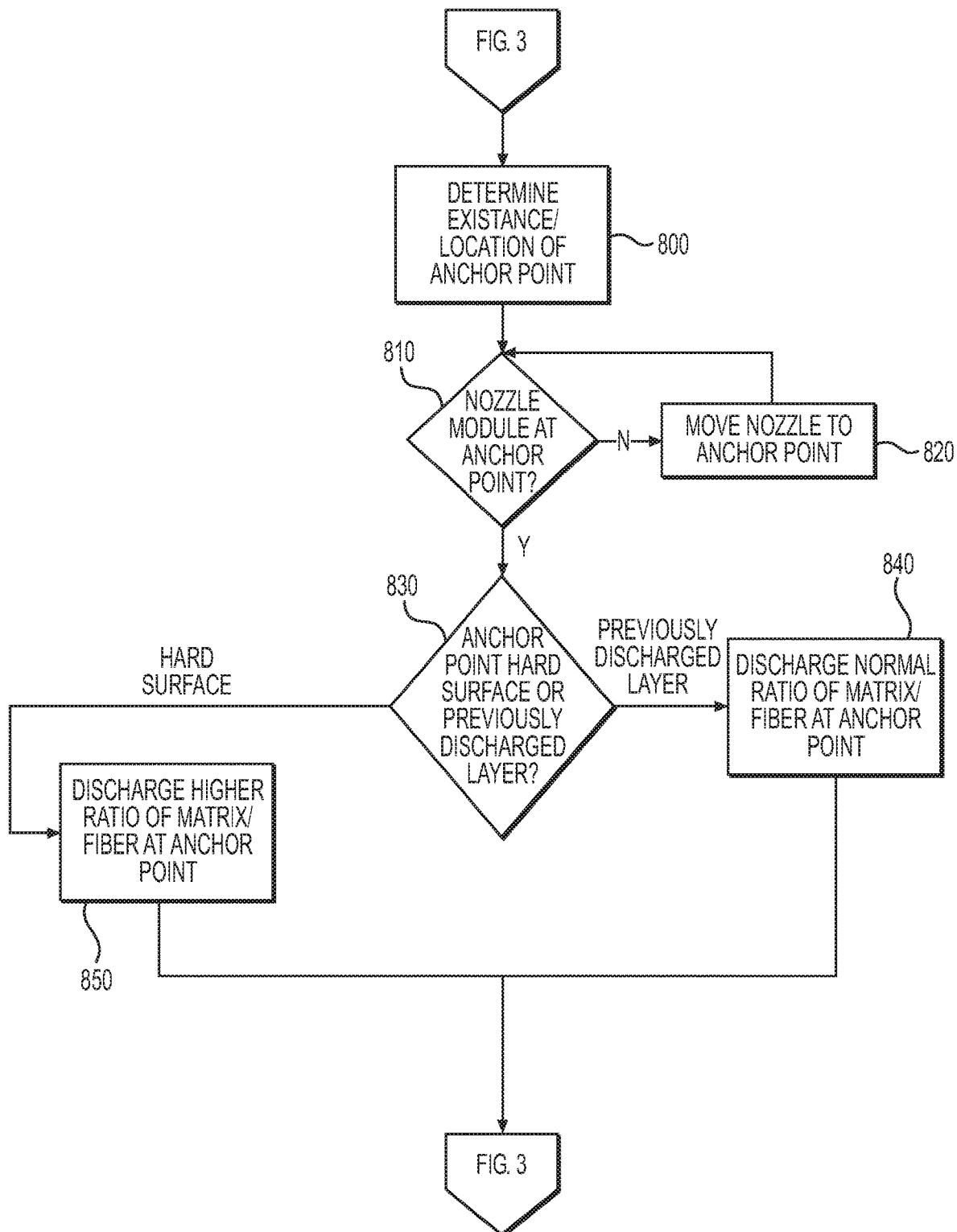

Returning to the Anchoring Module shown in FIG. 8, processor 36 may implement a procedure to cause machine 14 to secure a starting end of a first path of material to anchor point 32 (referring to FIG. 1), before causing the material to be pulled from nozzle module 24 according to the selected plan for fabricating the selected design of structure 12. This procedure may include a number of different steps, which may be implemented in any desired order. One of these steps may include determining if anchor point 32 exists and the location(s) (e.g., the coordinates) of any existing anchor points 32 (Step 800). In some embodiments, if no pre-existing anchor points 32 exist, processor 36 may need to first cause anchor points 32 to be created. Processor 36 may determine if any anchor points 32 exist based on manual input, based on the fabrication plan, and/or based on scanning of a print area (e.g., via one or more peripherals 40A).

When one or more anchor points 32 exist (and when anchoring is required), processor 36 may determine if nozzle module 24 is at an anchor point location (Step 810). Processor 36 may selectively activate one or more output devices of peripherals 40B to move nozzle module 24 to the anchor point location, if necessary (Step 820). Once nozzle module 24 is determined to be at the anchor point location, processor 36 may determine if the corresponding anchor point 32 is a hard surface (e.g., fully cured or otherwise stable surface) or a previously discharged (and still curing or unstable) surface (Step 830). This determination may be made, for example, based on a tracked amount of time elapsed since fabrication of the anchor point 24. When anchor point 32 is a previously discharged surface, processor 36 may cause a normal or baseline ratio of matrix-to-fiber to be discharged at the anchor point location (Step 840). This ratio may be achieved by moving a tip end of nozzle module 24 across the surface of anchor point 32 at a normal or baseline rate, such that the matrix deposited on anchor point 32 is proportional to an amount of fiber pulled from nozzle module 24. However, when anchor point 32 is a hard surface, processor 36 may cause a higher ratio of matrix-to-fiber to be discharged at the anchor point location (Step 850). This ratio may be achieved by the tip end of nozzle module 24 dwelling for a period of time at anchor point 32 and/or moving the tip across anchor point 32 at a slower rate, such that a greater amount of matrix is pushed out, leaks out, or otherwise is discharged out of the tip end for a given length of fiber being pulled out. The increased amount of matrix may improve adhesion to the hard surface. Cure enhancers 22 may be selectively activated by processor 36 during completion of Steps 840 and 850.

In some embodiments, the hard surface-type anchor points 32 may be equipped with one or more embedded electro-mechanism (e.g., energy sources, compaction sources, vibratory sources, magnetic repulsion or attraction sources, and/or other output devices of peripherals 40B). In these embodiments, during anchoring to the hard surface-type anchor points 32, processor 36 may be configured to selectively cause these electro-mechanisms to activate in order to improve anchoring.

Figure 9:
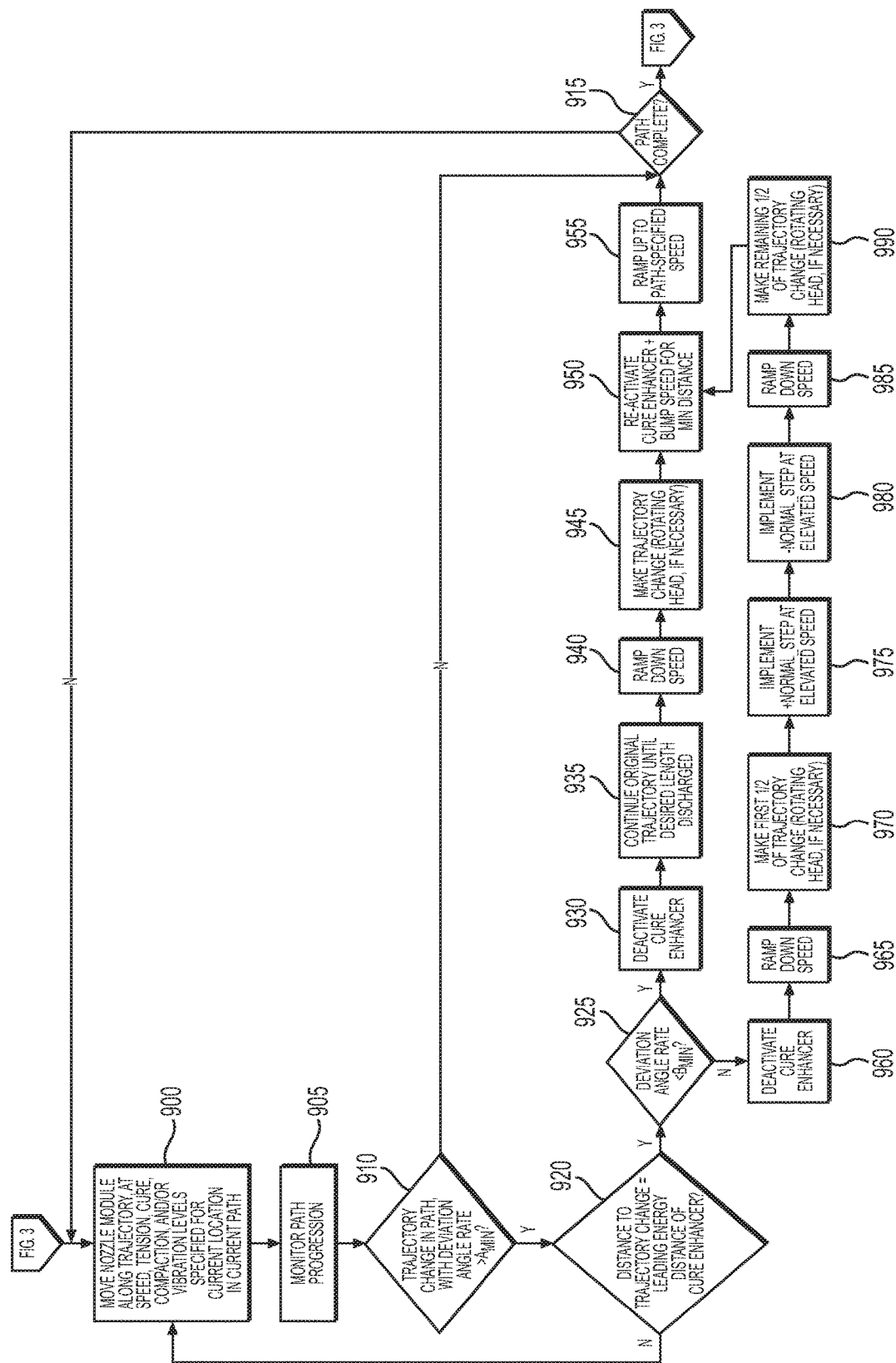

Returning to the Discharge Module of FIG. 9, after anchoring of a path of material, processor 36 may cause the material to be discharged (pulled and/or pushed) from nozzle module 24 (Step 900). This may involve, among other things, activating output devices of peripherals 40B associated with support 18 to move nozzle module 24 along a trajectory of the path at a specified speed, and regulating nozzle module 24 (e.g., one or more output devices of peripherals 40B inside of nozzle module 24) to release the associated fibers with a specified tension. In addition, processor 36 may selectively activate the output devices of peripherals 40B to compact the discharging material, to irradiate the discharging material, and/or to vibrate nozzle module 24 and/or the discharging material according to parameters specified for a given location within the path.

During the discharge of material from nozzle module 24, the progress of path fabrication may be monitored (Step 905). This monitoring may include, for example, detecting a current position of nozzle module 24, and comparing the current position to trajectory changes planned for the path (Step 910). When processor 36 determines that no significant trajectory changes (e.g., angular rate changes greater than a threshold angle rate) are planned for the current path, processor 36 may determine if the current path is complete (Step 915) and cycle back through Steps 900-915 until path completion.

However, when processor 36 determines at Step 910 that a significant trajectory change (e.g., a corner) is planned for the current path, processor 36 may determine how close the current location of nozzle module 24 (e.g., the tip of nozzle module 24) is to the trajectory change location (Step 920). For example, processor 36 may determine if a distance from a current location of the nozzle tip to the trajectory change is about equal to a distance from the nozzle tip to a leading edge of an energy area (an area of irradiance generated by cure enhancer(s) 22) that at least partially surrounds the nozzle tip. When these distances are not about equal (e.g. when the nozzle tip is not yet sufficiently near the corner location), control may return to Step 900.

However, when the tip of nozzle module 24 is close to the corner location (e.g., when the distance from the current location of the nozzle tip to the trajectory change is about equal to the distance from the nozzle tip to the leading edge of the energy area), processor 36 may determine if the corner is a sharp corner (e.g., if the angle rate of the trajectory change is greater than a threshold rate) (Step 925). When processor 36 determines that the trajectory change is not a sharp corner (e.g., when the angle rate of the trajectory change is less than the threshold rate), processor 36 may deactivate cure enhancer(s) 22, such that curing of subsequently discharged material is temporarily inhibited (or at least not enhanced) (Step 930).

Processor 36 may then control support 18 and/or head 20 (e.g., one or more output devices of peripherals 40B associated with support 18 and/or head 20) to continue discharging material past the trajectory change location (e.g., continuing in the original trajectory), until a desired length of material has been pulled from nozzle module 24 (Step 335). This desired length may be, for example, about equal to a distance from the tip of nozzle module 24 to a trailing edge of the energy area. In one embodiment, processor 36 may implement a ramp down in nozzle travel speed during the discharge of the desired length of material (Step 940).

After the desired length of material has been discharged along the original trajectory, processor 36 may cause support 18 to move head 20 and nozzle module 24 through the trajectory change to a new trajectory (e.g., to pivot nozzle module 24 through a specific angle around the corner, rotating nozzle module 24 if necessary to maintain fiber integrity), dragging the desired length of uncured material through an arc behind nozzle module 24 (Step 945). Processor 36 may then reactivate cure enhancer(s) 22 to cure the desired length of discharged material at its new location along the new trajectory (Step 950), and then ramp nozzle travel speeds back up to speeds previously planned for the given path of material (Step 955). In some embodiments, processor 36 may temporarily bump up the speed of nozzle module 24 immediately after cure enhancer(s) 2 have been activated (e.g., to a level higher than planned, before returning to the planned level) to generate a small tug on the material that functions to cast off excess matrix and/or free any snags that may have been created during the trajectory transition. Control may then progress to Step 915 described above.

Returning to Step 925, when processor 36 determines that the trajectory change is a sharp corner, processor 36 may deactivate cure enhancer(s) 22 (Step 960) and ramp down travel speed going into the corner (Step 965). Processor 36 may then cause support 18 to move nozzle module 24 through a first portion (e.g., a first ½) of the trajectory change, rotating nozzle module 24 during the movement in order to maintain fiber integrity (if necessary) (Step 970). It should be noted that this trajectory change may generally be accomplished within the same general plane. Processor 36 may then cause support 18 to move nozzle module 24 a step in a positive normal direction relative to the plane of the trajectory change (Step 975), followed by a step in a negative normal direction (Step 980). These movements may function to create slack in the associated fibers, thereby reducing snags and/or excessive forces on the pre-corner segment of the path that is already at least partially cured. Processor 36 may then cause support 18 to ramp down the travel speed of nozzle module 24 once more (Step 985), and then to cause support 18 to move nozzle module 24 through a remaining portion (e.g., a second ½) of the trajectory change (Step 990). Control may then pass through Steps 950, 955, and 915 described above.

Figure 10:
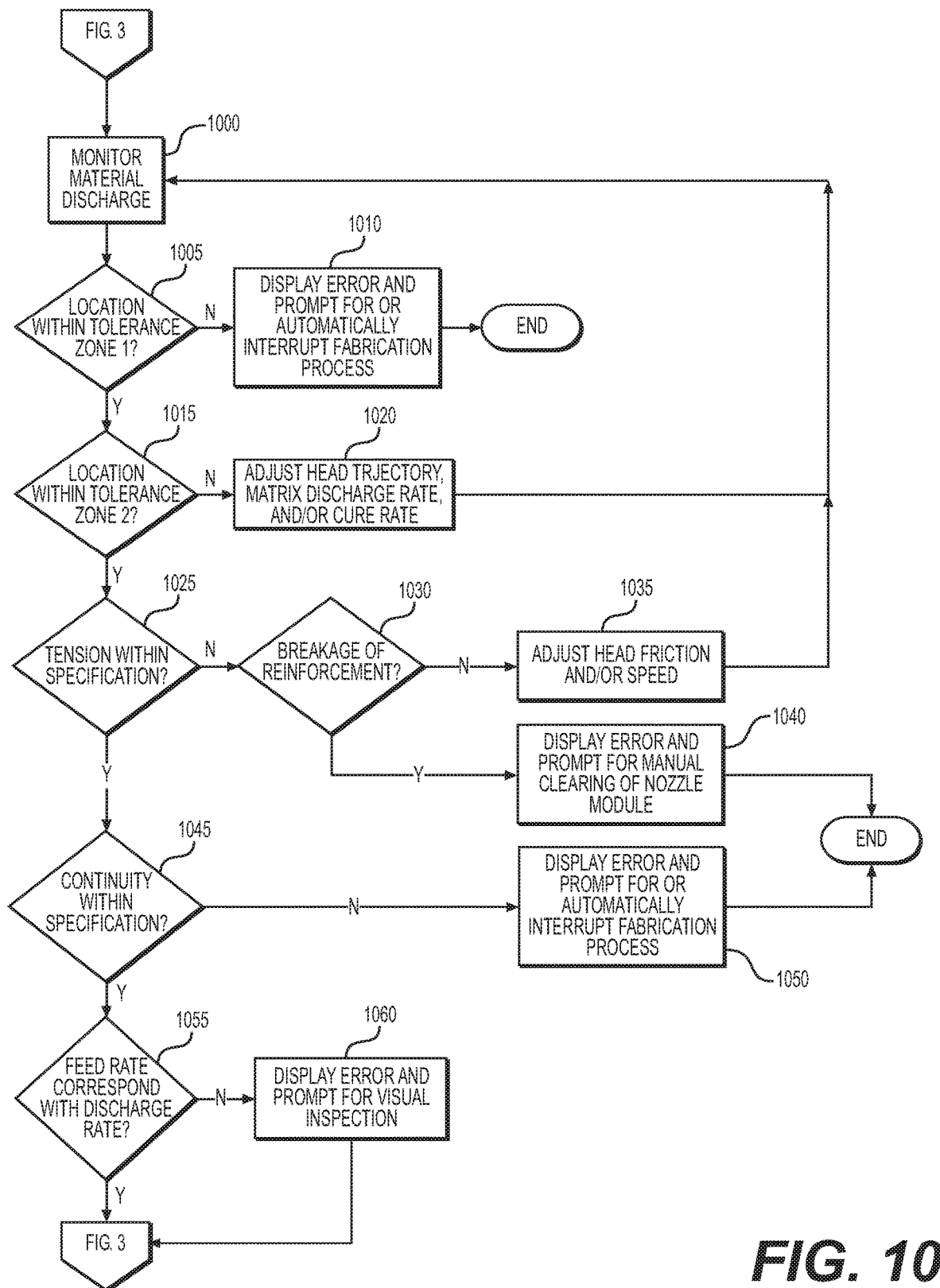

At any point during discharge of material from nozzle module 24, processor 36 may execute the Quality Control Module shown in FIG. 10. This may include, among other things, processor 36 monitoring material discharge from nozzle module 24 (e.g., via any one or more of input devices of peripherals 40A, such as an optical scanner that generates images of the discharging material) (Step 1000), and comparing a location and/or orientation of discharged material (e.g., an axis of the associated fiber(s) and/or a cross-sectional shape and size of the matrix coating on the fiber(s)) to a planned location and/or orientation (Step 1005). For example, processor 36 may compare the location and/or orientation to a first or wider tolerance zone positioned about the planned location and/or orientation. When it is determined that the discharged material falls outside of the first tolerance zone, processor 36 may cause an error to be shown on display 34 (referring to FIG. 1), and prompt for manual interruption of or automatically interrupt (e.g., abort) the current fabrication process (Step 1010). In this situation, fabrication of structure 12 may have failed.

However, when processor 36 determines at step 1005 that the discharged material is within the first tolerance zone, processor 36 may compare the location and/or orientation of the discharged material to a second or narrower tolerance zone positioned about the planned location and/or orientation (Step 1015). In this situation, even though some position deviation may have occurred, the deviation is still acceptable and can be corrected. Accordingly, processor 36 may automatically adjust operation of head 20 (Step 1020), and control may return to Step 1000. For example, processor 36 may adjust the trajectory of nozzle module 24 (e.g., via activation of one or more output devices of peripherals 40B associated with support 18 and/or head 20, for example to press adjacent paths closer together and/or to build up around the deviation). In another example, processor 36 may adjust a matrix discharge rate, such that a cross-sectional size and/or shape of the matrix surrounding the fiber may be altered. In yet another example, processor 36 may adjust a cure rate of the matrix material (e.g., increase or decrease the cure rate, by adjusting a position, orientation, and/or intensity of cure enhancers 22). Adjusting the cure rate may affect, for example, an amount of slump occurring before hardening and/or an amount of compaction that is possible prior to hardening.

At any point during execution of the Pathing Module, processor 36 may compare a current tension with the fibers of a discharged path with a tension specified in the path plan (Step 1025). When the current tension is significantly different from the specified tension (e.g., by at least a threshold amount), processor 36 may determine if one or more of the fibers has broken (Step 1030). In one embodiment, breakage of the fibers may be exhibited by a significant and/or sudden drop in fiber tension, as measured by one or more input devices of peripherals 40A. In another embodiment, breakage of the fibers may be determined by comparing a travel distance of nozzle module 24 (e.g., as exhibited via one or more input devices of peripherals 40A, such as rotary encoders, located at the tip of nozzle module 24) with a length of fibers supplied to nozzle module 24 (e.g., as exhibited via one or more input devices of peripherals 40A, such as feed rollers, located at a fiber inlet of nozzle module 24). When the travel distance is significantly greater than the supplied length of fibers, processor 36 may consider the fibers to have broken.

When processor 36 determines that the fibers in the current path are unbroken, and that the tension level in the fibers is simply not within specifications of the fabrication plan, processor 36 may automatically adjust the tension level (Step 1035). The tension level in the fibers may be adjusted in any number of different ways. For example, a travel speed of nozzle module 24 may be increased for a given supply rate of fibers to increase the tension level, and vice versa. In another example, the supply rate may be slowed relative to a given travel speed. One or more friction actuators (e.g., rollers inside of head 20) or other output devices of peripherals 40B may also or alternatively be selectively adjusted to thereby adjust the tension level of the fibers.

Control may return from Step 1035 to Step 1000.

When processor 36 determines that one or more of the fibers in the current path have broken, processor 36 may cause an error to be shown on display 34 (referring to FIG. 1), and prompt for manual interruption of or automatically interrupt the current fabrication process (Step 1040). In this situation, fabrication of structure 12 may have failed.

At any point during execution of the Pathing Module, processor 36 may compare an energy continuity (e.g., tensile continuity, electrical continuity, optical continuity, internal pressure continuity, etc.) of the fibers (e.g., electrical leads, fiber optics, gas lines, etc.) of a discharged path with a continuity specified in the fabrication plan (Step 1045). For example, processor 36 may selectively activate an energy source or other output device of peripherals 40B located at one end of a current path (e.g., at anchor point 32—referring to FIG. 1), while simultaneously monitoring signals generated by a corresponding continuity sensor or other input device of peripherals 40A located at an opposing end of the current path (e.g. at a fiber spool). Any loss of continuity (e.g., due to fiber cracks or breaks) may be exhibited in the form of low tension, high electrical resistance, low light transmittance, low pressure, etc. When this occurs, processor 36 may cause an error to be shown on display 34 (referring to FIG. 1), and prompt for manual interruption of or automatically interrupt the current fabrication process (Step 1050). In this situation, fabrication of structure 12 may have failed.

It may be possible in some configurations of machine 14 (e.g., in fiber-fed configurations), for fiber to bunch up inside of and clog head 20. Processor 36 may monitor for this condition, by comparing a feed rate of the fiber to a discharge rate (e.g., to a travel rate of nozzle module 24) (Step 1055). When the feed rate exceeds the discharge rate by a threshold amount, processor 36 may cause an error to be shown on display 34 (referring to FIG. 1), and prompt for manual interruption of or automatically interrupt the current fabrication process (Step 1060). In this situation, fabrication of structure 12 may have failed.

Figure 11:
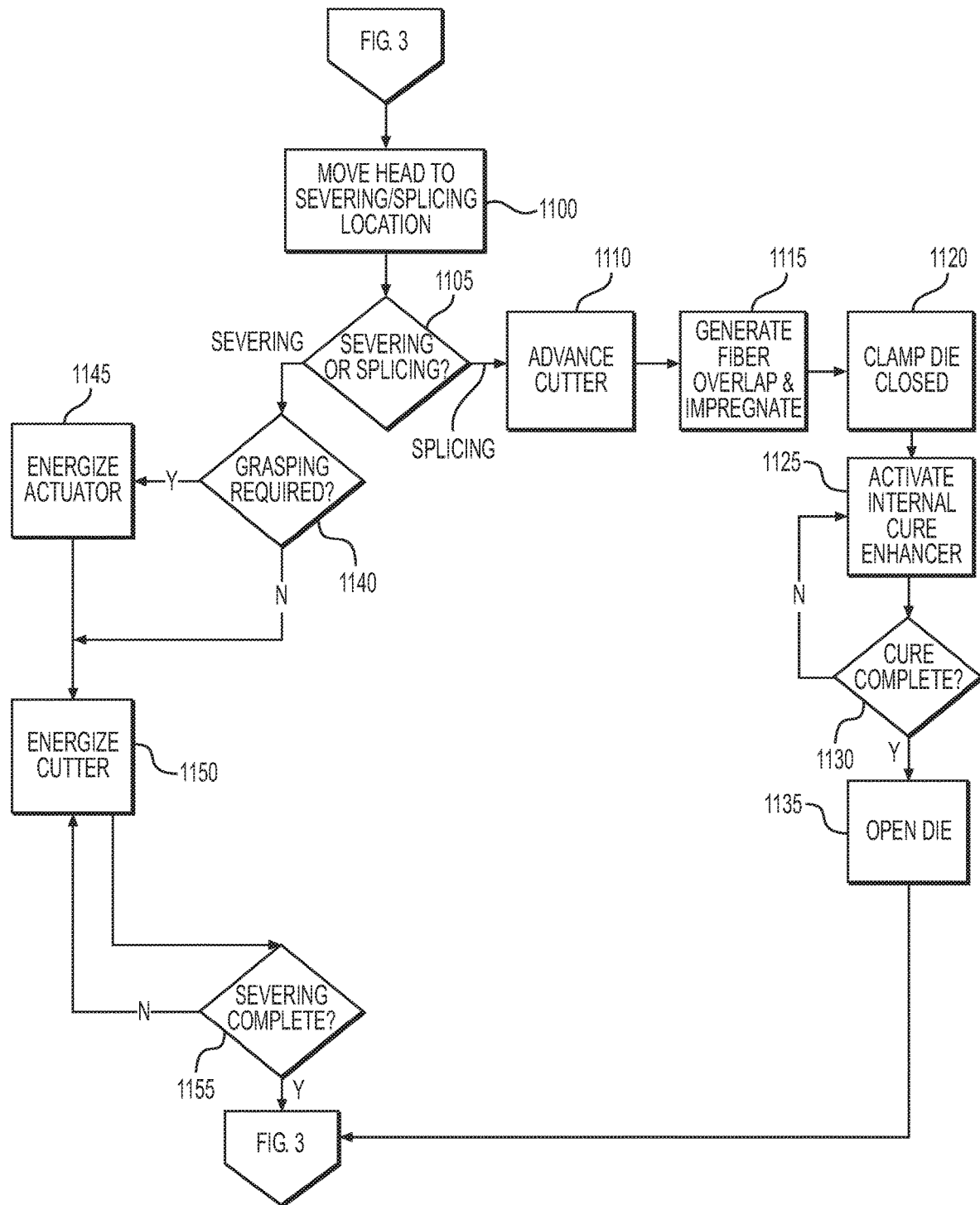

At any point during discharge of material from nozzle module 24, processor 36 may execute the Splicing/Severing Module shown in FIG. 11. For example, this module may be executed between fabrication of sequential paths, between fabrication of sequential layers, during swapping of nozzle modules 24 and/or fibers, when a fiber is broken or otherwise determined to be discontinuous, etc. During execution of this module, processor 36 may cause support 18 to move head 20 to the location of the required splice and/or severance (if head 20 is not already at the required location) (Step 1100). Processor 36 may then determine if splicing or severing is required (Step 1105). This may be determined in any number of different ways, for example based on the fabrication plan and a progression of a current path, based on an error code, based on manual input, etc. When splicing is required, processor 36 may activate one or more output devices of peripherals 40B to advance a cutter into and sever any existing fibers that are passing through nozzle module 24 (Step 1110), and then activate one or more other output devices of peripherals 40B to cause an end of a replacement fiber to overlap an end of the severed fiber (Step 1115). In some embodiments, both ends may already by impregnated with a splicing matrix. In other embodiments, however, the fiber ends to be spliced may be impregnated with the splicing matrix at Step 1115, for example via one or more output devices of peripherals 40B. Processor 36 may thereafter activate one or more other output devices of peripherals 40B to cause a die to clamp down over the impregnated fiber ends, pressing the ends together (1120). Internal cure enhancers (or other output devices of peripherals 40B) may then be activated to cure the splicing matrix, thereby bonding the ends to each other (Step 1125). Once processor 36 determines that the curing of Step 1125 is complete (e.g., based on an elapsed period of time, a temperature, etc.), processor 36 may cause the corresponding output devices of peripherals 40B to open the die and release the bonded ends.

Returning to Step 1105, when severing is required, processor 36 may determine if the fibers trailing from the tip of nozzle module 24 need to be grasped prior to severing (Step 1140). This determination may be made based on, among other things, characteristics of the fiber(s), characteristics of the matrix, and characteristics of the cutter. For example, a smaller fiber that is fully encased in a brittle matrix may not need to be grasped when cut with a laser-type cutter. However, a larger fiber that is encased in a more flexible matrix may need to be grasped prior to cutting via a pivoting blade. When grasping is required, processor 36 may energize the corresponding output devices of peripherals 40B (Step 1145), and selectively activate the corresponding cutter (e.g., energize an ultrasonic cutter to a desired frequency, energy a laser to a desired intensity, and/or extend or rotate a blade) (Step 1150). Processor 36 may monitor the severing (e.g., via one or more of input devices of peripherals 40A), and loop back through Step 1150 until severing is complete.

It will be apparent to those skilled in the art that various modifications and variations can be made to the disclosed systems and methods. Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. A system for additively manufacturing a structure, comprising:
    an additive manufacturing machine configured to discharge a composite material including a continuous reinforcement at least partially coated with a matrix;
    a memory having computer-executable instructions stored thereon; and
    a processor configured to execute the computer-executable instructions to:
        make a determination associated with the structure being a performance-critical part;
        based on the determination, selectively implement a first slicing technique and a second slicing technique to divide a virtual model of the structure into a plurality of layers; and
        cause the additive manufacturing machine to deposit the composite material corresponding to the plurality of layers,
    wherein:
        the first slicing technique is associated with discharge of the composite material based on efficiency;
        the second slicing technique is associated with discharge of material based on anticipated loading of the structure; and
        the processor is further configured to execute the computer-executable instructions to generate at least one tool path on each of the plurality of layers generated using the second slicing technique to be followed by the additive manufacturing machine during discharge of the composite material, the at least one tool path aligning the continuous reinforcement with a load vector passing through the structure.

2. The system of claim 1, wherein the processor is further configured to execute the computer-executable instructions to:
    receive input indicative of at least one of an anticipated loading condition of the structure and a performance specification; and
    make the determination based on the input.

3. The system of claim 1, wherein the plurality of layers generated using the first slicing technique are parallel and overlapping.

4. The system of claim 3, wherein the processor is further configured to execute the computer-executable instructions to generate at least one tool path on each of the plurality of layers generated using the first slicing technique to be followed by the additive manufacturing machine during discharge of the composite material, the at least one tool path spiraling outward from a center of each of the plurality of layers generated using the first slicing technique.

5. The system of claim 4, wherein the processor is further configured to execute the computer-executable instructions to organize the plurality of layers and the at least one tool path in a sequence to be followed by the additive manufacturing machine during discharge of the composite material.

6. The system of claim 1, wherein the processor is further configured to execute the computer-executable instructions to selectively use the second slicing technique to generate a new layer when the additive manufacturing machine is not capable of depositing the composite material corresponding to one of the plurality of layers generated using the second slicing technique.

7. The system of claim 1, wherein the processor is further configured to execute the computer-executable instructions to:
    determine a set of points on each of the plurality of layers through which composite material must be discharged to provide for a specified shape of the structure; and
    generate at least one tool path extending through at least two points of each set of points to be followed by the additive manufacturing machine during discharge of the composite material.

8. The system of claim 7, wherein the processor is further configured to execute the computer-executable instructions to determine the set of points based on a specified tolerance for the specified shape of the structure.

9. The system of claim 7, wherein the processor is further configured to execute the computer-executable instructions to:
    determine if an outlier point in the set of points is not consumed by the at least one tool path; and
    generate an additional tool path extending from a closest portion of the at least one tool path through the outlier point to be followed by the additive manufacturing machine during discharge of the composite material.

10. The system of claim 7, wherein the processor is further configured to execute the computer-executable instructions to assign a print speed to the additive manufacturing machine for completion of each of the at least one tool path based on at least one of a required matrix-to-reinforcement ratio and a curing characteristic.

11. A method of fabricating a structure with an additive manufacturing machine, the method comprising:
    receiving input indicative of at least one of an anticipated loading condition of the structure and a performance specification;

making a determination associated with the structure being a performance-critical part based on the input;
based on the determination, selectively implementing a first slicing technique to divide a virtual model of the structure into a plurality of overlapping layers and a second slicing technique to divide the virtual model of the structure into a plurality of layers, at least one of which is unsupported;
causing the additive manufacturing machine to deposit composite material corresponding to the plurality of layers;
generating at least a first tool path on each of the plurality of layers generated using the first slicing technique to be followed by the additive manufacturing machine during discharge of the composite material, the at least a first tool path spiraling outward from a center of each of the plurality of layers generated using the first slicing technique; and
generating at least a second tool path on each of the plurality of layers generated using the second slicing technique to be followed by the additive manufacturing machine during discharge of the composite material, the at least a second tool path generated using the second slicing technique being oriented based on the forces.

12. The method of claim 11, wherein:
selectively implementing the first slicing technique includes selectively implementing the first slicing technique to generate the plurality of layers that allow the additive manufacturing machine to deposit the composite material in a parallel and overlapping manner based on efficiency; and
selectively implementing the second slicing technique includes selectively implementing the second slicing technique to generate the plurality of layers that allow the additive manufacturing machine to deposit the composite material in layers based on forces anticipated to pass through the structure.

13. The method of claim 11, further including selectively using the second slicing technique to generate a new layer when the additive manufacturing machine is not capable of depositing the composite material corresponding to one of the plurality of layers generated using the second slicing technique.

14. The method of claim 11, further including:
determining a set of points on each of the plurality of layers through which composite material must be discharged to provide for a specified shape of the structure; and
generating at least one tool path extending through at least two points of each set of points to be followed by the additive manufacturing machine during discharge of the composite material.

15. The method of claim 14, further including:
determining if an outlier point in the set of points is not consumed by the at least one tool path; and
generating an additional tool path extending from a closest portion of the at least one tool path through the outlier point to be followed by the additive manufacturing machine during discharge of the composite material.

16. A non-transitory computer readable medium containing computer-executable programming instructions for performing a method of additively manufacturing a structure, the method comprising:
receiving input indicative of at least one of an anticipated loading condition of the structure and a performance specification;
making a determination associated with the structure being a performance-critical part based on the input;
based on the determination,
selectively implementing a first slicing technique to generate a plurality of layers that allow an additive manufacturing machine to deposit a composite material in a parallel and overlapping manner based on efficiency; and
selectively implementing a second slicing technique to generate a plurality of layers that allow the additive manufacturing machine to deposit the composite material based on forces anticipated to pass through the structure, wherein at least one of the plurality of layers generated via the second slicing technique is unsupported;
generating at least a first tool path on each of the plurality of layers generated using the first slicing technique to be followed by the additive manufacturing machine during discharge of the composite material, the at least a first tool path spiraling outward from a center of each of the plurality of layers generated using the first slicing technique;
generating at least a second tool path on each of the plurality of layers generated using the second slicing technique to be followed by the additive manufacturing machine during discharge of the composite material, the at least a second tool path generated using the second slicing technique being aligned with a load vector passing through the structure; and
causing the additive manufacturing machine to deposit composite material corresponding to the plurality of layers following the at least a first tool path and the at least a second tool path.

* * * * *